United States Patent
Qiu et al.

(10) Patent No.: US 9,806,344 B2
(45) Date of Patent: *Oct. 31, 2017

(54) ELECTROCHEMICAL ENERGY CONVERSION DEVICES AND CELLS, AND NEGATIVE ELECTRODE-SIDE MATERIALS FOR THEM

(71) Applicant: CHAOZHOU THREE-CIRCLE (GROUP) CO., LTD., Chaozhou, Guangdong (CN)

(72) Inventors: Jihua Qiu, Guangdong (CN); Shuoshuo Chen, Guangdong (CN)

(73) Assignee: CHAOZHOU THREE-CIRCLE (GROUP) CO., LTD., Chaozhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/110,101

(22) PCT Filed: Jan. 9, 2015

(86) PCT No.: PCT/AU2015/050006
§ 371 (c)(1),
(2) Date: Jul. 7, 2016

(87) PCT Pub. No.: WO2015/103674
PCT Pub. Date: Jul. 16, 2015

(65) Prior Publication Data
US 2016/0351913 A1     Dec. 1, 2016

(30) Foreign Application Priority Data

Jan. 9, 2014   (AU) ................................. 2014900069
Jan. 9, 2014   (AU) ................................. 2014900070

(51) Int. Cl.
*H01M 8/10*     (2016.01)
*H01M 4/86*     (2006.01)
(Continued)

(52) U.S. Cl.
CPC ....... *H01M 4/8663* (2013.01); *H01M 4/8657* (2013.01); *H01M 4/8673* (2013.01);
(Continued)

(58) Field of Classification Search
CPC ............ H01M 4/8663; H01M 8/2435; H01M 4/9066; H01M 4/9033; H01M 4/8673;
(Continued)

(56) References Cited

U.S. PATENT DOCUMENTS

2005/0170234 A1*  8/2005  Liu ...................... H01M 8/021
                                                              429/425
2008/0081223 A1*  4/2008  Yasumoto ............. C04B 41/009
                                                              429/532
2014/0272622 A1*  9/2014  Xing ................... H01M 4/9033
                                                              429/410

FOREIGN PATENT DOCUMENTS

WO     9628855 A1    9/1996
WO     9857384 A1    12/1998
(Continued)

OTHER PUBLICATIONS

Thomas Franco et al., Diffusion and Protecting Barrier Layers in a Substrate Supported SOFC Concept, E-Proceedings of the 7th European Fuel Cell Forum.
(Continued)

*Primary Examiner* — Stewart Fraser

(57) ABSTRACT

An electrochemical energy conversion device 10 comprising a stack of solid oxide electrochemical cells 12 alternating with gas separators 14, 16, wherein scavenger material selected from one or both of free alkali metal oxygen-containing compounds and free alkaline earth metal oxygen-containing compounds is provided in or on one or more of the negative electrode-side of the cell 12, the adjacent gas separator 16 and any other structure of the device 10 forming
(Continued)

a gas chamber 66 between the cell and the gas separator. The invention also extends to the treated cell 12.

21 Claims, 12 Drawing Sheets

(51) Int. Cl.
    *H01M 8/1213* (2016.01)
    *H01M 8/1231* (2016.01)
    *H01M 8/0202* (2016.01)
    *H01M 8/04089* (2016.01)
    *H01M 8/2432* (2016.01)
    *H01M 4/90* (2006.01)
    *H01M 8/243* (2016.01)
    *H01M 8/2435* (2016.01)
    *H01M 8/2425* (2016.01)
    *H01M 8/124* (2016.01)

(52) U.S. Cl.
    CPC ....... *H01M 4/9033* (2013.01); *H01M 4/9066* (2013.01); *H01M 8/0202* (2013.01); *H01M 8/04089* (2013.01); *H01M 8/1213* (2013.01); *H01M 8/1231* (2016.02); *H01M 8/243* (2013.01); *H01M 8/2432* (2016.02); *H01M 8/2435* (2013.01); *H01M 8/2425* (2013.01); *H01M 2004/8689* (2013.01); *H01M 2008/1293* (2013.01)

(58) Field of Classification Search
    CPC ............. H01M 8/2432; H01M 8/1231; H01M 4/8657; H01M 8/04089; H01M 8/0202; H01M 8/243; H01M 8/1213; H01M 2008/1293; H01M 2004/8689
    See application file for complete search history.

(56) References Cited

FOREIGN PATENT DOCUMENTS

| | | |
|---|---|---|
| WO | 9913522 A1 | 3/1999 |
| WO | 0075389 A1 | 12/2000 |
| WO | 2010040182 A1 | 4/2010 |

OTHER PUBLICATIONS

Limin Liu et al., Sulfur Tolerance Improvement of Ni-YSZ Anode by Alkaline Earth Metal Oxide BaO for Solid Oxide Fuel Cells, Electrochemistry Communications, 2012, p. 63-66.

\* cited by examiner

ELECTROCHEMICAL ENERGY CONVERSION DEVICES AND CELLS, AND NEGATIVE ELECTRODE-SIDE MATERIALS FOR THEM

PRIORITY

This application claims priority from Australian Provisional Patent Applications 2014900069 and 2014900070 each filed on 9 Jan. 2014 (the priority applications), and the entire content and disclosure of each of those provisional patent applications is incorporated herein by reference.

TECHNICAL FIELD

The present invention relates to electrochemical energy conversion devices as well as to solid oxide electrochemical cells for them, and is particularly concerned with reducing degradation in the electrochemical performance of the cell s and devices.

BACKGROUND ART

Electrochemical energy conversion devices include fuel cell systems as well as hydrogen generators and other electrolysers, such as for co-electrolysing water and $CO_2$.

Fuel cells convert gaseous fuels (such as hydrogen, natural gas and gasified coal) via an electrochemical process directly into electricity. A fuel cell continuously produces power when supplied with fuel and oxidant, normally air. A typical fuel cell consists of an electrolyte (ionic conductor, $H^+$, $O^{2-}$, $CO_3^{2-}$ etc.) in contact with two electrodes (mainly electronic conductors). On shorting the cell through an external load, fuel oxidises at the negative electrode resulting in the release of electrons which flow through the external load and reduce oxygen at the positive electrode. The charge flow in the external circuit is balanced by ionic current flows within the electrolyte. Thus, at the positive electrode oxygen from the air or other oxidant is dissociated and converted to oxygen ions which migrate through the electrolyte material and react with the fuel at the negative electrode/electrolyte interface. The voltage from a single cell under load conditions is in the vicinity of 0.6 to 1.0 V DC, and current densities in the range of 100 to 1000 $mAcm^{-2}$ can be achieved. In addition to the electricity, water is a product of the fuel cell reaction. Hydrogen generators and other electrolysers may be considered as fuel cell systems operating in reverse. Thus, a hydrogen generator produces hydrogen and oxygen when electricity and water are applied to the electrochemical cell.

A fuel cell system capable of producing electricity may be designed to run in reverse in order to produce hydrogen, for example producing electricity during the day and hydrogen at night, with the hydrogen optionally being stored for use the next day to produce more electricity. However, it may be advantageous from the efficiency perspective to design separate fuel cell systems and hydrogen generators. While the invention is concerned with electrochemical energy conversion devices generally, for convenience only it will be described hereinafter primarily with reference to electricity generating fuel cell systems and cells for them.

Several different types of fuel cells have been proposed. Amongst these, solid oxide fuel cell systems (SOFC) are regarded as the most efficient and versatile power generation system, in particular for dispersed power generation, with low pollution, high efficiency, high power density and fuel flexibility, and the invention is particularly concerned with solid oxide electrochemical energy conversion cells and with devices using them. Numerous SOFC configurations are under development, including tubular, monolithic and planar designs, and are now in production. The planar or flat plate design is perhaps the most widely investigated and now in commercial use, and the invention is particularly concerned in one aspect with electrochemical energy conversion devices comprising a stack of such solid oxide electrochemical cells. However, in another aspect, the invention also extends to solid oxide electrochemical energy conversion cells generally, that is it is concerned with tubular cells and monolithic cells, as well as with planar cells.

For convenience only, the invention will be further described solely with respect to planar or flat plate design solid oxide electrochemical energy conversion cells, and devices using them. In these devices, individual planar SOFCs comprising electrolyte/electrode laminates alternate with gas separators, called interconnects when the gas separators convey electricity from one SOFC to the next, to form multi-cell units or stacks. Gas flow paths are provided between the gas separators and respective electrodes of the SOFCs, for example by providing gas flow channels in the gas separators, and the gas separators maintain separation between the gases on each side. Apart from having good mechanical and thermal properties, as well as good electrical properties in the case of interconnects and good electrochemical properties in the case of the fuel cells themselves, the individual fuel cell device components must be stable in demanding fuel cell operating environments. SOFCs operate in the vicinity of 600° C.-1000° C. and, for devices using them to be economical, typical lifetimes of 5-6 years or more of continuous operation are desired. Thus, long term stability of the various device components is essential. Only a few materials fulfil all the requirements. In general, the high operating temperature of the SOFCs, the multi-component nature of the devices and the required life expectancy of several years severely restricts the choice of materials for the fuel cells, gas separators and other components such as seals, spacer plates and the like.

A variety of different materials have been proposed for SOFC gas separators, including ceramic, cermet and alloys. For electrically conductive gas separators, that is interconnects, metallic materials have the advantage generally of high electrical and thermal conductivities and of being easier to fabricate. However, stability in a fuel cell environment, that is high temperatures in both reducing and oxidising atmospheres, limits the number of available metals that can be used in interconnects. Most high temperature oxidation resistant alloys have some kind of built-in protection mechanism, usually forming oxidation resistant surface layers. Metallic materials commonly proposed for high temperature applications include, usually as alloys, Cr, Al and Si, all of which form protective layers. For the material to be useful as an interconnect in SOFC devices, any protective layer which may be formed by the material in use must be at least a reasonable electronic conductor. However, oxides of Al and Si are poor conductors. Therefore, alloys which appear most suitable for use as metallic interconnects in SOFCs, whether in cermet or alloy form, contain Cr in varying quantities.

Cr containing alloys form a layer of $Cr_2O_3$ at the external surface which provides oxidation resistance to the alloy. The formation of a $Cr_2O_3$ layer for most electrical applications is not a problem as it has acceptable electrical conductivity. However, for SOFC applications, a major problem is the high vapour pressure and therefore evaporation of oxides and oxyhydroxides of Cr $Cr^{6+}$) on the positive electrode side of the fuel cell at the high operating temperatures. At high temperatures, oxides and oxyhydroxides of Cr ($Cr^{6+}$) are stable only in the gas phase and have been found to react with positive electrode materials leading to the formation of new phases such as chromates, which destroy the electrode material and make it electrically resistive, as well as to deposits of $Cr_2O_3$ on the electrolyte. These reactions very quickly reduce electrode activity to the oxygen reduction reaction at and adjacent the positive electrode/electrolyte interface, and thereby considerably degrade the electrochemical performance of the cell.

It has been attempted to alleviate this problem of degraded electrochemical performance by coating the positive electrode side of the interconnect with a perovskite barrier layer such as strontium-doped lanthanum manganite ($LaMnO_3$) (LSM), which may also be the material of the positive electrode, but while short term performance was maintained there continued to be an unacceptable long term degradation in performance.

The problem of degradation due to evaporation of oxides and oxyhydroxides of Cr from chromium-containing materials on the positive electrode side of the fuel cell was greatly relieved by the invention described in the applicant's WO96/28855, that is forming a self-repairing coating on the positive electrode side of a chromium-containing interconnect, the coating comprising an oxide surface layer comprising at least one metal M selected from the group Mn, Fe, Co and Ni and a M, Cr spinel layer intermediate the chromium-containing substrate of the interconnect and the oxide surface layer. Such a coating may also be formed on other chromium-containing heat resistant steel surfaces that are on the positive electrode side of the plant. However, it remains a challenge to ensure the coating remains fully dense to prevent the release of the chromium species in the demanding fuel cell operating conditions.

Other solutions have also been proposed for alleviating the degradation in fuel cell performance due to evaporation of oxides and oxyhydroxides of Cr on the positive electrode side of the fuel cell. For example, a low (or no) chromium steel is proposed in the applicant's WO00/75389, in which an alumina coating is formed on oxidation of the surface rather than chromium oxide. However, due to the low electrical conductivity of alumina, this heat resistant steel composition is not suitable for gas separators that are intended to act as interconnects conducting electricity from one side to the other.

In a further effort to limit the problem of degradation due to evaporation of oxides and oxyhydroxides of Cr on the positive electrode side of the fuel cell, it has been proposed to introduce another layer (referred to hereinafter as "shield layer") on the positive electrode layer to absorb chromium before it reaches the positive electrode layer.

Positive electrode materials for SOFCs are generally perovskites or oxides having perovskite-type structures (refined to herein as "perovskites"), such as lanthanum strontium manganite or LSM ($La_{1-x}Sr_xMnO_{3-\delta}$), lanthanum strontium cobaltite or LSCo ($La_{1-x}Sr_xCoO_{3-\delta}$), lanthanum strontium ferrite or LSF ($La_{1-x}Sr_xFeO_{3-\delta}$), $La_{1-x}Sr_xCo_{1-y}Fe_yO_{3-\delta}$ (LSCF), $LaNi_xFe_{1-x}O_{3-\delta}$ (LNF), and $Ba_{1-x}Sr_xCo_{1-y}Fe_yO_{3-\delta}$ (BSCF) where $0 \leq \delta < 1$ depending on the dopant. Other examples include $Sm_xSr_{1-x}CoO_{3-\delta}$ (SSC), $La_xSr_{1-x}Mn_yCo_{1-y}O_{3-\delta}$ (LSMC), $Pr_xSr_{1-x}FeO_{3-\delta}$ (PSF), $Sr_xCe_{1-x}Fe_yNi_{1-y}O_{3-\delta}$ (SCFN), $Sr_xCe_{1-x}Fe_yCo_{1-y}O_{3-\delta}$, $Pr_xCe_{1-x}CO_yFe_{1-y}O_{3-\delta}$ and $Pr_xCe_{1-x}Co_yMn_{1-y}O_{3-\delta}$. In the strontium-containing perovskites, for example, the strontium is provided as a doping agent that is bound into the perovskite structure.

The aforementioned shield materials proposed to date have been perovskites, for example having a similar composition to the positive electrode layer but more reactive with chromium than the positive electrode material in order to absorb it before it reaches and reacts with the positive electrode layer. In one example where the positive electrode material is LSM the shield layer material is LSCo ($La_{1-x}Sr_xCoO_{3-\delta}$), but other materials are possible.

Some barrier materials are proposed in the paper by Thomas Franco et al "*Diffusion and Protecting Barrier Layers in a Substrate Supported SOFC Concept*", E-Proceedings of the 7th European Fuel Cell Forum, Lucerne (2006), P0802-051. This paper also sets out additional details on the reactions occurring.

Even with these advancements, it is found that degradation of fuel cell performance remains a problem. This has led to extensive further investigations by the applicant as to the causes, from which additional positive electrode material poisons have been identified.

As a result of these investigations the applicant has found that sulphur poisons the positive electrode of an SOFC in much the same way as chromium, by forming sulphate crystals with components of the electrode material, such as strontium, a d possibly destroying the chemical structure of the electrode material. It has been found that the sulphur may be derived from the oxidant supply (generally air), usually in the form of $SO_2$, or from elsewhere in the system, for example in the glass seals used to seal the SOFCs and gas separators together or elsewhere upstream of the positive electrode-side chamber, where the sulphur may be present as an impurity and appear as $SO_2$ or $SO_3$.

The further investigations have also shown that boron can act in the same way as chromium and sulphur to poison the positive electrode material in the conditions of use. Boron may be present in the system as a compound of the glass seals, but may also be present in other components of the fuel cell system exposed to the oxidant.

It is believed that other element present in the system components, or in the oxidant supply, whether as impurities or otherwise, may also be reacting with components of the positive electrode material and poisoning the material. Possible examples of these elements include silicon.

Alleviating reactions with the positive electrode material by poisons in the system in use of an electrochemical energy conversion cell, and therefore alleviating cell performance degradation, is an aim of the invention described and claimed in a co-pending PCT patent application filed by the applicant concurrently herewith and claiming priority from the priority applications, entitled "*Electrochemical Energy Conversion Devices and Cells, and Positive Electrode-Side Materials for them*", the contents of which are incorporated herein by reference.

However, the applicant's further investigations into the causes of fuel cell performance degradation has revealed that in addition to poisoning of the positive electrode material, the negative electrode side also suffers from performance degradation.

SOFC negative electrode materials are generally nickel based, most commonly Ni/YSZ cermets. Other nickel cermets being used as negative electrode materials include Ni/GDC (Ni/gadolinium doped ceria), Ni/SDC (Ni/samarium doped ceria), Ni/ScSZ (Ni/scandiastabilised zirconia) and Ni/ScCeSZ (Ni/scandia ceria stabilised zirconia). Pt, Rh and Ru have all been used in place of nickel in cermet negative electrode materials, but these metals are considerably more expensive than nickel and therefore much less common.

It is well known that sulphur reacts with nickel in negative electrode materials under SOFC operating conditions to degrade the performance of the electrode, and for this reason sulphur is commonly removed from SOFC fuel sources. However, the applicant's further investigations have led to a belief that, even if sulphur is removed from the fuel source, sulphur continues to degrade the negative electrode material. This is believed to be as a result of residual sulphur in the fuel or as a result of sulphur from elsewhere in the system, for example in the glass seals used to seal the SOFCs and gas separator or elsewhere upstream of the negative electrode, where the sulphur may be present as an impurity. Some of the reasons for degradation of the negative electrode material performance due to sulphur are believed to be: at very low sulphur levels, for example as low as 1 ppm in the gas stream, the electrode material can degrade due to surface adsorption of the sulphur on the nickel; at higher levels of sulphur, Ni—S alloys are formed; and at even higher levels of sulphur, nickel sulphides form.

The effect on SOFC anodic performance of hydrogen and hydrocarbon fuels contaminated with up to 50 ppm wet H2S was investigated by Limin Liu et al, in the paper "*Sulfur Tolerance Improvement of Ni-YSZ Anode by Alkaline Earth Metal Oxide BaO for Solid Oxide Fuel Cells*", Electrochemistry Communications 19 (2012) 63-66. In the paper it is reported that BaO infiltrated throughout the functional anode layer at a level of about 5 wt % was found to enhance the sulphur tolerance ability of the Ni—YSZ anode over the test period of 27 hours. It was concluded that water played a very crucial role in this, and that this may result from the good water dissociative absorption ability of BaO.

The applicant's further investigations on the negative electrode side have also identified that boron and phosphorus species from seals and other components of the device may be entering the atmosphere in the negative electrode-side chamber and leading to performance degradation in some way. In the case of boron at least this appears to be by promoting grain growth in the nickel or other metal of the electrode material. The phosphorus species may be reacting with the nickel and poisoning it.

Other species that have been found to be detrimental to the negative electrode-side performance, possibly as a result of reacting with and thereby poisoning the nickel, are chlorine, siloxane and selenium. These may be present on the negative electrode side as impurities, for example, in the fuel gas or the glass used for the seals.

Another problem identified on the negative electrode side is the unintended ongoing sintering of nickel in porous layers in the negative electrode-side chamber, particularly but not only in the negative electrode-side structure of the electrochemical cell, including the negative electrode material. This sintering leads to a loss of surface area in the porous layer or layers and a decrease of the triple phase boundary area of the electrode layer, resulting in degradation in electrochemical performance.

It is clear that it would be highly desirable to alleviate long-term degradation of cell performance on the negative electrode side in use of an electrochemical energy conversion cell.

SUMMARY OF THE INVENTION

According to a first aspect of the present invention there is provided an electrochemical energy conversion device comprising a stack of solid oxide electrochemical cells alternating with gas separators, wherein each electrochemical cell comprises a layer of solid oxide electrolyte, a negative electrode-side structure on one side of the electrolyte layer and comprising one or more porous layers including a functional layer of negative electrode material having an interface with the one side of the electrolyte layer, and a positive electrode-side structure on the opposite side of the electrolyte layer and comprising one or more porous layers including a layer of positive electrode material having an interface with the opposite side of the electrolyte layer, wherein said electrochemical cell and a first of the gas separators on the negative electrode side of the electrochemical cell at least partly form therebetween a negative electrode-side chamber and said electrochemical cell and a second of the gas separators on the positive electrode side of the electrochemical cell at least partly form therebetween a positive electrode-side chamber, and wherein chemically unbound material selected from one or both of free alkali metal oxygen-containing compounds and free alkaline earth metal oxygen-containing compounds is provided in or on one or more of the negative electrode-side structure, the first gas separator and any other structure of the electrochemical energy conversion device forming the negative electrode-side chamber, the unbound material acting to reduce degradation of electrochemical performance on the negative electrode side of the electrochemical energy conversion device during use of the device, and wherein if the chemically unbound material is provided in the functional layer of negative electrode material there is no chemically unbound material present at the interface with the electrolyte layer.

It is not entirely clear to the inventors how the presence of the chemically unbound material on the negative electrode side in accordance with the invention is acting to reduce degradation of the cell performance, but it is clear that it does.

It is possible that the free or chemically unbound material acts as a scavenger to prevent or alleviate the reactions of negative electrode material poisons with the negative electrode material, that is elements or species that react with the negative electrode material in some way, or at the electrode/electrolyte interface, causing reaction products in use of the device that degrade the electrochemical performance of the cell. For convenience, therefore, and without limiting the scope of the invention, the chemically unbound material may be referred to as "scavenger material" herein. The poisons may include sulphur species, boron species and phosphorus species, but other species such as chlorine, siloxane and selenium may also be reacting with or otherwise affecting the negative electrode material, or at the electrode/electrolyte interface, and detrimentally affecting the performance of the cell in use. The poison effect may include adsorption into an element or component of the electrode material, alloying with an element or component of the electrode material, and forming salts (in the case of, for example, chlorine) with an element or component of the electrode material. The poisons may alternatively, or in addition, be depositing at and adjacent the interface and blocking the fuel reaction sites. The poisons may be derived from the atmosphere, such as fuel in the case of a fuel cell or steam in the case of a generator, or from system components in or external to the negative electrode-side chamber. The free alkaline metal oxygen-containing compounds and/or free alkaline earth metal oxygen-containing compounds, usually in the form of oxides but not necessarily, have a higher chemical activity or affinity for the poisons relative to the negative electrode material and therefore react preferentially with the poisons to prevent or alleviate the poisons reaching at least the electrode/electrolyte interface, preferably to prevent or alleviate the poisons reaching or reacting with the negative electrode material in the functional layer at all. The element or component of the negative electrode material with which the poisons would be expected to react are the nickel or other metal in a cermet composition, but this may not always be the case.

It is possible that the chemically unbound material is also or alternatively acting in other ways to limit access of poisons to the negative electrode material in some embodiments, such as by blocking the release of negative electrode material poisons from the first gas separator and/or other structure of the device, for example forming the negative electrode-side chamber.

It is also possible that the chemically unbound material is acting in some other way to alleviate degradation of the electrochemical performance on the negative electrode side of the cell, including increasing electrical conductivity on the negative electrode side. For example, it is believed to be possible that the unbound material is in some way acting to alleviate sintering of the metal in a metal/cermet negative electrode material.

It will be understood that the unbound material may be provided in or on any one or more of at least part of the first gas separator exposed to the negative electrode-side chamber and any structure of the electrochemical energy conversion device forming the chamber other than the negative electrode-side structure of the electrochemical cell and the first gas separator, such as spacer plates, cell support plates, conductor layers and/or compliant layers, but in embodiments the unbound material is provided in or on the negative electrode-side structure of the electrochemical cell.

Accordingly, in a second aspect of the invention there is provided an electrochemical energy conversion cell comprising a layer of solid oxide electrolyte, a negative electrode-side structure on one side of the electrolyte layer and comprising one or more porous layers including a functional layer of negative electrode material having an interface with the one side of the electrolyte layer, and a positive electrode-side structure on the opposite side of the electrolyte layer and comprising one or more porous layers including a layer of positive electrode material having an interface with the opposite side of the electrolyte layer, wherein chemically unbound material selected from one or both of free alkali metal oxygen-containing compounds and free alkaline earth metal oxygen-containing compounds is provided in or on the negative electrode-side structure and acts to reduce degradation of electrochemical performance on the negative electrode side of the electrochemical energy conversion cell during use of the cell, and wherein if the chemically unbound material is provided in the functional layer of negative electrode material there is no chemically unbound material present at the interface of that layer with the electrolyte layer.

The electrochemical energy conversion cell may take any form, such as planar, tubular or monolithic, and the invention extends to electrochemical energy conversion devices incorporating any of them.

The electrolyte layer may be a dense layer of any ceramic material that conducts oxygen ions. Known ionic conductors that have been proposed as solid oxide electrochemical energy conversion cell electrolyte materials include yttria-stabilised zirconia, often zirconia doped with 3 or 8 mol % yttria (3YSZ or 8 YSZ), scandia-stabilised zirconia, zirconia doped with 9 mol % $Sc_2O_3$ (9ScSZ), and gadolinium-doped ceria (GDC). The most common of these is YSZ.

Some electrolyte layers may comprise sub-layers, for example a layer of primary electrolyte material and a surface layer of ionically conductive ceramic material. In one embodiment, destructive reactions can occur between YSZ electrolyte material and some positive electrode materials such as LSCF. It has been proposed to alleviate these by providing a barrier layer of ionically conductive YSZ-ceria on the electrolyte material. In one embodiment the ceria may be doped with samarium. One method of forming such a barrier layer is described in the applicant's WO2010/040182.

It will be appreciated by those skilled in the art that the phrases "during use of the device", "during use of the cell" and equivalents encompass not only use of the device or cell to produce electricity or as an electrolyser, but also during pre-sintering of the cell and during heating up of the device when the metal, usually nickel, of the negative electrode and other layers of the negative electrode-side structure may be in the oxide state.

In embodiments, the chemically unbound material selected from one or both of free alkali metal oxygen-containing compounds and free alkaline earth metal oxygen-containing compounds (hereinafter "chemically unbound material" or "unbound material") may be provided in an unbound material coating, which may be a surface coating (that is exposed at the surface), on one or more of the negative electrode-side structure, the first gas separator and any other structure forming the negative electrode-side chamber, including any inlet to or outlet from the chamber. The unbound material coating may be applied as a continuous or discontinuous layer having, for example a thickness between 0.01 and 250 μm, preferably between 0.01 and 50 μm. Although 0.01 μm has been identified as a minimum thickness, no specific minimum thickness has been determined below which the coating becomes ineffective. However, thinner coatings become increasingly difficult to produce. A thickness of 250 μm is believed to provide sufficient active material for many years of use of the electrochemical energy conversion device or cell, with a thickness of 50 μm providing sufficient protection on the negative electrode side for the likely working life of the device or cell of up to 10 years. Greater thicknesses are possible, but in current designs are considered unnecessary. The maximum thickness of the coating may also be dependent on the design of the negative electrode-side chamber.

The unbound material coating may be continuous and dense on surfaces through which there is intended to be no gas transport and no electrical contact, for example a non-electrically connecting gas separator and/or one or more other plates or components forming the negative electrode-side chamber. If the surface to which the coating is applied is intended to have gases passing through it to or from the chamber, the coating would be discontinuous, for example, porous and/or segmented. Thus, when formed on the outer-most layer of the negative electrode-side structure of the electrochemical cell, generally a highly porous, electrically conducting, contact layer formed of nickel or other acceptable metal, for example a noble or other metal that does not poison the negative electrode material, including the metal of a cermet negative electrode material, the unbound material coating would desirably be porous to permit gas flow through it. It may also or alternatively be segmented. If the porous coating is formed on the contact face of a first gas separator in the form of an interconnect, it would desirably be segmented so that it is not present at the contact points of the interconnect with the negative electrode-side structure or other conductive material. In some embodiments the interconnect has channels, for example in the form of grooves, formed in the contact surface for the transmission of gases to and/or from the negative electrode-side structure, in which case the coating material may only be provided in the channels. Any coating of unbound material on the contact surface must be sufficiently discontinuous to not unacceptable limit the electrical contact.

The interconnect may have an electrically conductive contact layer on it, formed for example of nickel or other metal as above. The interconnect contact layer may have a thickness of 50 to 200 µm, for example 75 to 150 µm, and is designed to ensure good thermal and electrical contact with the negative electrode-side structure, but is advantageously porous. If the coating of unbound material is also provided, it may be beneath the contact layer of the interconnect or on it.

The first gas separator, when used as an interconnect, may have a dense nickel, or other suitable conductive metal as above, coating on it to alleviate electrical resistance between the separator substrate material, such as chromium-containing heat-resistant steel, and an adjacent layer of the separator or device, and the coating of unbound, material may be on this. The dense metal coating may have a thickness of, for example, 10 to 100 µm, such as 15 to 50 µm. The dense metal coating may be formed by spraying, for example thermal spraying.

Other layers may also or alternatively be provided on the first gas separator. For example, at pages 5 and 6 of the aforementioned paper by Franco et al, it is noted that both diffusion of nickel can occur from the anode into a ferritic steel matrix substrate (that, can convert the substrate into an austenitic structure leading to mismatches in the coefficient of thermal expansion) and diffusion of iron and chromium species from the interconnect substrate into the anode up to the anode/electrolyte interface. The authors propose to alleviate this by a diffusion barrier layer or protective coating of perovskite materials, particularly doped $LaCrO_3$ perovskites. The unbound material coating could be provided on such a diffusion barrier layer.

Other structure that may be between the first gas separator and the electrochemical cell in the negative electrode-side chamber include separate conductor and/or compliant layers, and these, or one or more of them, may also have the unbound material coating applied to them, or to other coating layers on them. The aforementioned compliant layer may be, for example, a metallic mesh such as of nickel or other suitable conductive metal as above. Two examples of nickel meshes, or nickel coated, meshes, are described in the applicant's WO98/57384 and WO99/13522. The purpose of a compliant layer is to take up variations in thickness between the gas separator and the electrochemical cell while being porous to atmosphere in the negative electrode-side chamber, as well as to act as an electrical conductor. It may replace some or all of the contact layer(s).

The unbound material coating may consist only of the chemically unbound material, for example free alkaline earth metal oxide or free alkali metal oxide, possibly with some residual precursor oxygen-containing compounds of the metal or metals such as nitrate or carbonate.

The unbound material coating may be formed by spray coating or otherwise coating a solution of one or both of free alkali metal oxygen-containing compound(s) and free alkaline earth metal oxygen-containing compound(s), or precursor material for it. Generally, the unbound material will be free oxide, which due to its reactivity can only be applied in precursor form. The compound(s) or precursor may be selected from salts such as nitrites, nitrates, carbonates, acetates and oxalates or from hydroxides. The solution may be applied in plural passes in order to achieve the desired thickness but a single pass may be adequate. A minimum single sprayed coating thickness may be 0.01 µm. Once applied to the selected surface, the solution is dried, for example in an oven, at a drying temperature dependent upon the material. For strontium nitrate the drying temperature may be in the range 50-80° C.

The solution may comprise the oxygen-containing compound (which may be a precursor) and water, optionally with a dispersant such, as 2-amino-2-methyl-1-propynol. The dispersant is only required if there is a risk of the salt recrystallising in the solution and may be added at a level sufficient to prevent recrystallisation, usually after the solution has been formed. The water present in the coating solution will evaporate when the solution is dried. The oxygen-containing compound may be added to the water at the maximum level that is readily dissolvable, which will vary for different compounds. The minimum level may be dependent upon the desired number of applications, such as spray coatings. For strontium nitrate, the preferred concentration is between 10 and 45 wt %, for example about 30 wt %, in water. Lower concentrations such as in the range 10 to 30 wt % tend to result in finer particles in the sprayed coating, leading to greater reactivity of the unbound material.

After drying, the scavenger coating is fired to burn off any dispersant and to convert any precursor scavenger material partially or totally to oxide. The minimum temperature at which this may be done is dependent on the materials, but generally is about 450° C. for nitrate precursor materials.

The firing may be performed during the manufacture of the component, after the coating has been applied, but is conveniently performed in the electrochemical energy conversion device, during pre-sintering at a temperature in the range of, for example, 700° C. to 900° C., such as 850° C.

In a variation of the unbound material where the unbound material or precursor of it is not soluble in water, the coating may be screen printed or otherwise applied, for example by spraying, as a slurry of particulate unbound material, or precursor, and binder which is then fired. Suitable binders include those listed hereinafter for screen printing inks. In embodiments, particle sizes are in the range of about 0.01 to 25 µm, for example in the range 0.01 to 10 µm. Firing may be performed as described above for the coating solutions.

Alternatively, or in addition to the unbound material coating, the unbound material may be present in any of one or more layers of the negative electrode-side structure, one or more layers of the first gas separator and one or more layers of any other structure of the electrochemical energy conversion device, where each of those layers is accessible to atmosphere in the negative electrode-side chamber. While the unbound material may be localised in the respective layer, it is preferably dispersed in it, at least throughout the portion of the layer exposed to the atmosphere in the negative electrode-side chamber.

Although in this embodiment the unbound material is provided in any of the one or more layers exposed to atmosphere in the negative electrode-side chamber, the unbound material remains free, that is chemically unbound to the chemical structure of the respective layer. It may therefore be more reactive than the layer material to poisons and/or more active at preventing the release of poisons and/or more active at alleviating sintering of the negative electrode material, as described above.

The negative electrode-side structure of the electrolytic cell will invariably comprise a layer of functional negative electrode material with a degree of porosity, generally a nickel cermet, possibly with a mixture of two or more ceramic phases, of the type listed above adjacent the layer of electrolyte material. The unbound material may be provided in the functional electrode layer, but advantageously there is none. Providing no unbound material in the functional layer of negative electrode material avoids any risk that the unbound material will detrimentally impact on gas access through the porous functional electrode layer to the triple phase boundary of the gas with the electrolyte and electrode materials. Such detrimental impact could be by the unbound material physically blocking gas channels through the porous functional electrode layer and thereby restricting gas passage to or from the electrochemical reaction sites and/or by unbound material physically sitting on the reaction sites, making those reaction sites inactive.

If unbound material is provided in the functional layer of negative electrode material, it may be dispersed evenly through the thickness of the layer of negative electrode material except at the interface of the electrolyte and electrode materials. Providing no chemically unbound material at the negative electrode/electrolyte interface is important for alleviating risk of the unbound material detrimentally impacting on the reaction sites at the interface available to the fuel gas (in fuel cell mode) or for converting hydrogen ions to hydrogen (in electrolyser mode) as described above. This may be done by grading the amount of unbound material through the thickness of the functional electrode layer, from a maximum at the surface remote from the electrolyte layer to zero at the interface. Alternatively, if the unbound material is provided in the functional layer of negative electrode material, it maybe provided only in a portion of the thickness of the layer remote from the interface. As the triple phase boundary area, that is the zone containing the reaction or active catalysing sites, may extend up to about 10 microns in to the functional electrode layer from the interface, advantageously that portion is at least 5 microns, preferably at least 10 microns, more preferably at least 15 microns, from the interface. In that portion of the thickness of the functional electrode layer, the amount of unbound material may be even or graded.

If the negative electrode layer is not designed as a supporting layer, it may have a small thickness of, for example 5 to 50 μm, such as 10 to 20 μm. If in addition to being a functional layer it is a supporting layer, a thickness up to 250 μm or more may be required.

The negative electrode-side structure may include one or more porous layers on the layer of functional negative electrode material. These layers must be porous to permit access of the atmosphere in the negative electrode-side chamber to the layer of negative electrode material. The porosity in each of these layers may be about the same as that of the layer of negative electrode material, but preferably it is greater to ensure ready access of the atmosphere to the layer of negative electrode material.

If more than one porous layer is provided on the layer of negative electrode material, the porosity of all those layers may be the same, or, for example, it may increase for each layer more remote from the layer of negative electrode material. The unbound material may be provided in one or more of these layers, or in none of them. If it is provided, it may be in each layer or in only one or some of plural layers. In each layer in which it is provided, it may be localised or evenly dispersed through the thickness of the layer. Alternatively, it may be graded through the thickness of the layer, increasing in amount away from the layer of negative electrode material, or present in only a portion of the thickness of the layer, for example a portion most remote from the layer of positive electrode material.

An outermost porous layer of the negative electrode-side structure (excluding any unbound material or scavenger coating) may be a contact layer, for example of nickel as described above, designed in the case of the gas separator being an interconnect to establish electrical contact between the cell and interconnect. It may have a thickness in the range of, for example, 20 to 100 μm and have a porosity in the range of, for example, 10% to 85%. The thickness will generally depend upon the cell and device design, but too thick a contact layer may lead to integrity problems and cracking of the layer. Too thin a contact layer may lead to too small a capacity to carry scavenger material in it. In one embodiment the thickness may be in the range of 25 to 50 μm.

The contact layer may have even porosity throughout its thickness or increasing porosity away from the layer of negative electrode material. One or more further contact layers may be provided between the outermost contact layer and the layer of negative electrode material, preferably each such further contact layer having less porosity in the aforementioned range than the next adjacent contact layer on its side remote from the layer of negative electrode material. Each such further contact layer may have even porosity throughout its thickness of increasing porosity from a side closest to the layer of negative electrode material.

Another porous layer that may be provided as part of the negative electrode-side structure is a substrate or support layer. The substrate layer will generally be disposed between the layer of negative electrode material and any contact layer and serves as a support layer for all of the other layers of the cell. It may be formed of the same or a similar cermet material as the negative electrode material, so that it performs some of the functions of the functional layer. The substrate layer may have a thickness of, for example, 100 to 500 μm, such as 150 to 250 μm. Too thin a substrate layer may not give it sufficient strength to perform its support function, but too great a thickness may lead to excessive rigidity as well as greater resistance to gas transport and electrical conductance.

In some SOFC designs, the physical support layer of the cell may be the electrolyte layer or a positive electrode-side substrate layer, in which case the negative electrode-side substrate layer may be omitted and the functional layer of negative electrode material may be at or towards the lower end of the thickness range noted above.

The first gas separator may comprise any one or more of the aforementioned contact layer and barrier layer or protective coating of perovskite or other material, and the unbound material may be provided in one or more of them.

As with any unbound material provided in the porous layers of the negative electrode-side structure, the unbound material in any one of the aforementioned layers of the first gas separator exposed to atmosphere in the negative electrode-side chamber, may be localised or evenly dispersed throughout the layer. Alternatively it may be graded through the thickness of the layer, for example increasing in amount away from or towards the substrate gas separator material, or present in only a portion of the thickness of the layer, such as a portion most remote from the substrate gas separator material. Generally, however, the graded or localised provision is not necessary and the unbound material is evenly dispersed in the respective layer.

One or more coating layers as described above, for example of nickel or suitable other metal cermet or of metal alone, may be provided on other structure of the electrolytic energy conversion device forming the negative electrode-side chamber, and unbound or scavenging material may be provided in accordance with the invention in any one or more of those layers. Such other structure includes any inlet plenum component (which may be part of the first gas separator), a cover plate, a support plate and a compliant or conductive layer as already described. The coating layer on any of this structure may be dense or porous according to its function. The coating layer differs from the aforementioned unbound material coating in that the unbound material coating may comprise essentially only the chemically unbound material.

Generally, the layer or layers in which the unbound material may be provided in accordance with this aspect of the invention are applied by tape casting an appropriate slurry composition and laminating the layers and/or screen printing an ink onto a substrate or previously-deposited layer, This includes the functional layer of negative electrode material, any substrate layer of the negative electrode-side structure, any contact layer of the negative electrode-side structure, any contact layer on the side of the first gas separator exposed to atmosphere in the negative electrode-side chamber, and any such or other layer on any other component of the electrochemical energy conversion device forming part of the negative electrode-side chamber. Other methods, such as pad printing and spraying, may be used for forming each layer, but tape casting is preferred for the anode functional and substrate layer and screen printing is preferred for the contact layers and will be described further.

The screen printing ink for each contact layer is formed by mixing the particulate nickel, or other suitable metal, and a pore former with binder, dispersant and solvent. The pore former may be omitted or at reduced levels for less porous layers. Suitable binders include alcohol such as ethanol or propanol mixed with ester such as hydroxypropyl cellulose ether. Suitable dispersants include 2-amino-2-methyl-1-propanol. The solvent may be a water miscible organic.

The tape casting slurries for the negative electrode functional and substrate layers may be formed by mixing particulate NiO or other suitable metal oxide, YSZ or other suitable doped or stabilised oxide, and, in the case of the substrate layer, a pore former, with binder, dispersant and solvent as described above. If the negative electrode functional layer also acts as a substrate or support layer for the entire cell, some pore former may be added to ensure adequate porosity.

If the unbound material or its precursor dissolves in water, it may be added to the base ink or slurry as a solution formed as described above in relation to the unbound coatings. If the unbound material or its precursor is not dissolvable in water, it may be mixed into the ink or slurry as a powder or mixed with the base layer powder prior to formation of the slurry. Particle sizes for the unbound material may be in the range 0.01 to 25 µm, preferably in the range 0.01 to 10 µm. The maximum particle size is limited by the thickness of the layer or coating in which it is provided. Thus, for thicker coatings the unbound material particle size may be greater than 25 microns. However, finer particle sized unbound material will result in greater surface area, with a consequent increase in activity, The particle size of the unbound material may be smaller than that of the layer material.

For the aforementioned barrier layer on the first gas separator, the unbound material may be provided in it by mixing the same solution or powder, depending upon solubility, in the perovskite layer mixture.

The unbound material may be provided in any one porous layer, or in a protective metal coating or barrier layer at a level in the range of about 0.1 to 65 vol % of the total solid content of the layer or coating. More preferably, the range is about 1 to 25 vol %. In order to have electrical continuity, the conducting phase should form at least 35 vol % of the layer or coating, leaving a maximum of 65 vol % unbound material. In practical terms, 35 vol % of the conducting phase provides relatively low electrical conductivity, and a smaller proportion of unbound material is preferred. While any proportion of unbound material up to 65 vol % is acceptable, for example any proportion in the range 26 to 65 vol %, the more preferred maximum is 25 vol % to provide a balance between good electrical conductivity and long term protection from the unbound material. While proportions of unbound material as low as 0.1 vol % are believed to provide the desired protection, the more preferred minimum of 1 vol % will provide longer-term protection. In some embodiments, the proportion of unbound material relative to the total solid content, of the layer or coating is advantageously from 0.6 wt %, for example greater than 5 wt % or even 10 wt % or more.

Preferred cations for the unbound material are selected from one or more of $Sr^{2+}$, $Ca^{2+}$, $Ba^{2+}$, $Mg^{2+}$, $Na^+$ and $K^+$.

As with the unbound material described with reference to unbound material coatings, generally the chemically unbound material in one or more of the aforementioned layers or coatings will comprise free oxide. However, due to its reactivity such a scavenging material can only be added to the layer material in precursor form, preferably selected from salts such as nitrites, nitrates, carbonates, acetates and oxalates and from hydroxides. After tape casting the negative electrode functional and/or substrate layer slurry with the precursor material in it, the layer will be fired at a temperature in the range of 1300° C. to 1500° C. in air, resulting in the oxide being formed. At the same time, the binder, dispersant and any graphite and residual solvent burn off, leaving the cermet layer, which in the case of the substrate layer is porous as a result of the graphite. Subsequently, the NiO reduces to nickel, resulting in some porosity in the functional layer. In a variation, the precursor material may be impregnated in to the layer material, as a solution, after firing the layer material. Impregnation is not preferred for at least the functional layer of negative electrode material of the negative electrode-side structure as it is difficult to control the permeation of the solution through the layer(s), and therefore difficult to ensure there is no unbound material at the interface of the layer of electrolyte material with the functional layer of negative electrode material.

In the contact layers, the initial heating up of the stack in air to a temperature in the range of 700° C. to 900° C., during pre-firing and -sintering, result in the pore former, binder, dispersant and any residual solvent burning off to leave porous NiO (or other suitable metal oxide) and any chemically unbound alkali metal oxide and alkaline earth oxide, as well as any residual free precursor material. Subsequently, the NiO reduces to nickel.

In many fuel cell systems for producing electricity, natural gas or other hydrocarbon is internally reformed in the stack, with the anode material, as the negative electrode of the cell acting as the reforming catalyst. Under these circumstances it is desirable to only use free alkaline earth metal oxygen-containing compounds as the chemically unbound material since alkali metals tend to poison the reforming reaction.

BRIEF DESCRIPTION OF THE DRAWINGS

Various embodiments of an electrochemical energy conversion device in accordance with the invention and test results associated with the various embodiments will now be described by way of example only with reference to the accompanying drawings, in which.

DETAILED DESCRIPTION OF PREFERRED EMBODIMENTS

Figure 1:
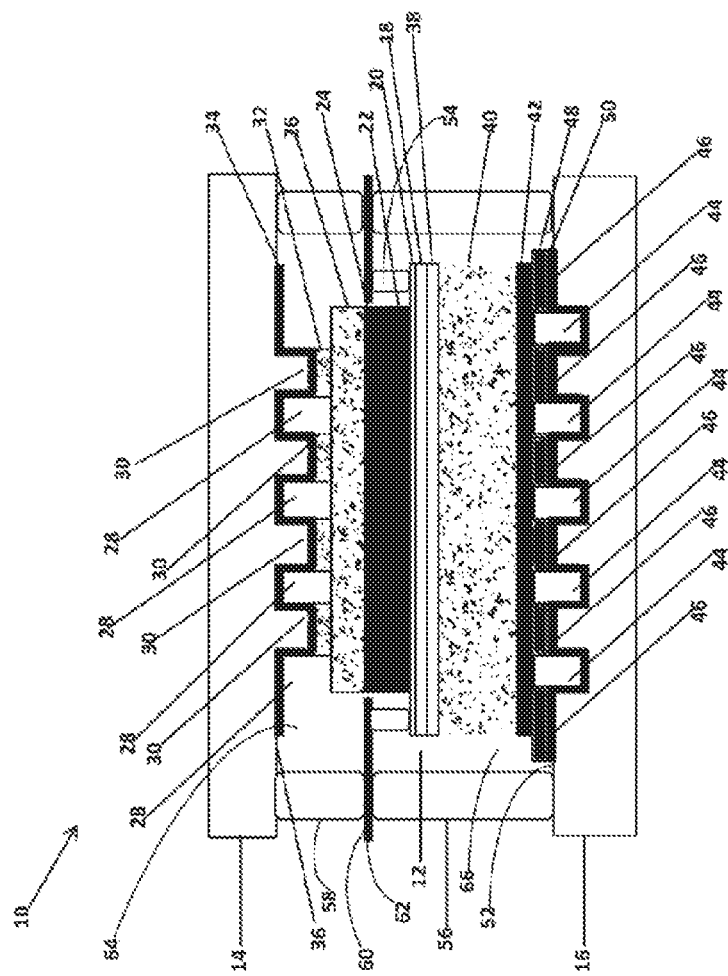
FIG. 1 is a sectional view (not to scale) of a typical fuel cell assembly configuration of the type used to test the invention.

FIG. 1 is sectional view illustrating a planar fuel cell assembly 10 of the type used to test the present invention. The figure is not to scale and is provided in the form shown for ease of illustration. The assembly 10 comprises a fuel cell unit 12 between opposed interconnect plates 14 and 16. In a commercial fuel cell device, multiples of these assemblies 10 would be stacked on top of each other, with each pair of abutting interconnector plates 14 and 16 being formed as a single plate. As illustrated, the interconnect plate 14 is a positive electrode- or cathode-side interconnect, while the interconnect plate 16 is a negative electrode- or anode-side interconnect. They are formed of chromium-containing high temperature resistant ferritic steel such as Crofer 22HJ Crofer 22APU and ZMG 232L.

Between the interconnect plates 14 and 16, the fuel cell unit 12 comprises a dense electrolyte layer 18 of 8YSZ having a thickness in the range of 5 to 20 μm, for example 10 μm, with a doped ceria barrier layer 20 on the cathode side. The barrier layer 20 prevents reactions between the electrolyte layer 18 and certain cathode layers. Depending on the combination of the electrolyte and cathode materials, the barrier layer may not be necessary. If it is provided, it may be mixed phase ceria zirconia layer as described in WO2010/040182 and may have a thickness in the range of 0.5 to 1.5 μm.

The cathode layer 22 formed on the electrolyte barrier layer 20 is a porous perovskite such as LSCF and has a thickness in the range of 20 to 30 μm. A cathode shield layer 24 is provided on the cathode layer 22, followed by a cathode cell contact layer 26, both formed of LSCo with the contact layer being more porous than the shield layer, which may in turn be more porous than or of similar porosity to the cathode layer. The shield layer has a high degree of tortuosity relative to the contact layer 26 and a thickness of about 20 μm and is designed with a large surface area to reduce the likelihood of poisons o the cathode side of the fuel cell unit reaching the cathode layer 22 by virtue of the strontium bound in the perovskite structure reacting with those poisons in the pores of the shield layer. As will be appreciated, the shield layer 24 may be redundant in view of the provision of unbound scavenger material on the cathode side.

The cathode cell contact layer 26 has a thickness of about 125 μm and provides an electrically conductive layer between the interconnect plate 14 and the cathode layer 22.

The cathode interconnect plate 14 is provided with grooves or channels 28 for gaseous oxidant, usually air, supply and the removal of gases on the cathode side (in fuel cell mode). Between the grooves or channels 28 peaks or lands 30 are defined which form contact faces with the cathode cell contact layer 26. To enhance the electrical contact between the cathode interconnect plate 14 and the cathode cell contact layer 26, a cathode interconnect plate contact layer 32 is provided on the lands 30 to directly contact the cathode cell contact layer 26. The cathode plate contact layer 32 is also formed of LSCo and has a similar porosity to the contact layer 26. It may have a thickness of 75 to 125 μm.

Also on the cathode side, a barrier coating 34 is provided across the entire surface 36 of the interconnect plate 14 exposed to the oxidant in use of the cell assembly, between the surface 36 and the contact layer 32. The barrier coating 34 is intended to prevent the release of chromium species from the interconnect plate 14, and may be a spinel layer as described in WO96/28855 having a thickness of 15 to 30 μm.

On the anode side, an anode functional layer 38 having a degree of porosity is provided on the opposite side of the electrolyte layer 18 to the cathode layer 22. It is formed of a Ni/8YSZ cermet having a thickness of 10 to 12 μm.

A porous anode substrate layer 40 of Ni/3YSZ cermet having a thickness of 180 to 200 μm is provided on the opposite side of the anode functional layer 38 to the electrolyte layer 18, and has a greater porosity than the functional layer 38. The substrate layer 40 acts as a structural support layer for all of the other layers of the fuel cell unit 12.

An anode cell contact layer 42 is provided on the substrate layer 40 on the opposite side to the functional layer 38 to enhance the electrical connection between the anode substrate layer 40 and the anode interconnect plate 16. It is formed of porous metallic nickel, generally more porous than the substrate layer 40, and has a thickness of about 30 μm.

As on the cathode side, the anode interconnect plate 16 is provided with grooves or channels 44 for the delivery of fuel gas to the anode side of the fuel cell unit 12 and removal of reacted fuel (in fuel cell mode). Between the grooves or channels 44, peaks or lands 46 are defined, and the same porous nickel material is provided as an anode interconnect plate contact layer 48 on them. The contact layer 48 may have a thickness of about 100 μm.

To improve electrical conductivity between the interconnect plate 16 and its contact layer 48, a dense layer of nickel 50 is formed on the side 52 of the plate exposed to fuel. The dense nickel coating may have a thickness of 15 to 45 μm and extends across the lands 46 and channels 44.

Most if not all of these layers of the fuel cell assembly 10 are known in the prior art and do not require describing further. However, briefly, the dense electrolyte layer 18 may be made by tape casting particulate 8YSZ slurry and firing it. The electrolyte barrier layer 20 is formed as described in WO2010/040182. The cathode layer 22 is formed by screen printing an ink made with LSCF perovskite material and hinder, onto the barrier layer 20 and firing it. The cathode shield layer 24 and contact layer 26 are formed by screen printing an ink comprising LSCo perovskite material and binder, as well as a pore former such as carbon, polymer beads, corn starch, high molecular weight binders or graphite in the case of the contact layer. The shield layer 24 is screen printed onto the cathode layer 22 and the contact layer 26 is screen printed onto the shield layer 24. After screen printing the layers are fired.

The cathode interconnect spinel barrier coating 34 may be formed as described in WO96/28855, while the cathode interconnect contact layer 32 is identical to the cathode cell contact layer 26 but screen printed onto the barrier coating 34. After screen printing the contact layer 32 is fired.

The anode substrate layer 40 is formed first by tape casting a slurry of NiO, 3YSZ, pore former selected from those described above, dispersant and solvent. During firing, the pore former, binder and dispersant burn off, leaving pores and a substrate structure of NiO and 3YSZ. After pre-sintering of the assembly, the NiO in the substrate reduces to Ni to produce the porous Ni/3YSZ substrate structure.

The anode functional layer 38 is tape cast as a slurry of NiO, 8YSZ, binder, dispersant and solvent. During firing, the binder, dispersant and solvent burn off leaving a smaller degree of porosity than in the substrate layer 40. After pre-sintering, the NiO in the substrate reduces to Ni to provide the functional layer of Ni/8YSZ cermet. Porosity in the functional layer arises from the volume change occurring during the NiO→Ni conversion. The electrolyte layer 18 is tape cast onto the functional layer 38.

On the opposite side of the substrate layer 40 the anode cell contact layer 42 is formed by screen printing an ink consisting of Ni, pore former selected from those described above and binder. During the initial heating of the cell assembly 10 (part of the pre-sintering procedure), the binder and pore former burn off leaving NiO which is subsequently reduced to porous Ni.

The tape east cell layers may be formed on a preceding layer or one or more may be formed separately and laminated.

The same screen printing ink and procedure are used for the contact layer 48 on the anode interconnect plate 16, while the dense contact layer 50 is formed first by thermally spraying metal powder onto the face 52 so that it is formed in the groove 44 as well as on the lands 46.

To complete the cell assembly 10 (prior to pre-sintering) the cathode side of the assembly must be sealed from the anode side, and both must be sealed from external atmosphere. To do this, a series of glass seals 54, 56 and 58 and a cover plate 60 are used. The various cathode side layers 22, 24 and 26 of the cell 12 do not extend to the edge of the electrolyte layer 18, and the glass seal is formed on the electrolyte barrier layer 20 as an annulus that extends entirely around the cathode layer 22. The cover plate 60 is formed of the same ferritic steel as the interconnect plates 14 and 16 and is an annulus that is seated on the glass seal 54 and extends outwardly therefrom. Towards its outer periphery 62, the cover plate 60 is also supported on the glass seal 56, which is itself an annulus that is supported on the anode interconnect plate 16 outwardly of the fuel cell unit 12 and at least the anode interconnect plate contact layer 48. The glass seal 58 is also an annulus that is supported on the cover plate 62 and extends to the cathode interconnect plate 14 outwardly of the cathode side of the fuel cell unit 12 and the cathode plate barrier coating 34.

A positive electrode or cathode side oxidant and exhaust chamber 64 is formed between the electrolyte barrier layer 20, the glass seal 54, the cover plate 60, the glass seal 58, the cathode interconnect plate 14 and/or the cathode plate barrier coating 34, with the porous cathode layer 22, cathode shield layer 24, cathode cell contact layer 26 and cathode side interconnect plate contact layer 32 being an integral part of the cathode side chamber 64.

Similarly, a negative electrode or anode side chamber 66 is formed between the electrolyte layer 18, the glass seal 54, the cover plate 62, the glass seal 56, the anode side interconnect plate 16 and/or the dense anode interconnect layer 50, with the anode functional layer 38, the anode porous substrate layer 40, the anode cell contact layer 42 and the anode interconnect plate contact layer 48 being an integral part of the anode side chamber 66.

It will be appreciated that at least one inlet to and at least one outlet from each chamber 64 and 66 must be provided to supply oxidant to and remove oxidant exhaust from the cathode side chamber 64 and supply fuel gas and remove fuel exhaust from the fuel side chamber 66 (in fuel cell mode). These have not been shown in FIG. 1 merely for clarity of the section.

As described, the cell assembly 10 formed the basis of the tests represented as "no Sr" in FIGS. 2 to 8 and 10. It will be appreciated from these graphs of electrical output degradation (measured as percentage variation relative to an output at about 0 hours against time, where a positive degradation means the electrical output is decreasing) that the cell assembly as described suffers from electrical output degradation for at least one of the reasons described herein.

It will be understood that this degradation occurs even though, for example, at least the cathode shield layer 24 and the cathode plate barrier coating 34 as well as the anode plate dense contact layer 50 are designed to alleviate the degradation.

The applicant has found, though, that the provision of free alkaline earth metal oxygen containing compounds and/or free alkali metal oxygen containing compounds on or in one or both of the positive and negative electrode-side chambers can substantially alleviate the electrical performance degradation. If the fuel cell assembly is to be used for internally reforming hydrocarbon fuel gas, such as natural gas, to hydrogen, alkali metal oxygen containing compounds should be avoided on the negative electrode or anode side since these compounds tend to have a detrimental effect on the reforming reaction.

Generally the oxygen-containing compound will be an oxide, but due to the reactivity of these oxides they need to be added as precursor. Depending on the thermal stability of the precursor, some precursor material may exist as free oxygen-containing compound alongside the free or unbound oxide. The preferred oxide is SrO (conveniently referred as "Sr" in FIGS. 2 to 9), but other oxides in the two Groups are known to perform very similarly, particularly CaO, BaO, MgO, Na$_2$O and K$_2$O.

The oxygen-containing compound can be provided in or on any one of various components of one or both of the cathode and anode chambers 64 and 66. FIGS. 2 to 9 and 11 illustrate the provision of free SrO, and any residual strontium nitrate precursor, in various of those locations identified in the Figures as positions 1-7. The location of these positions relative to the cell assembly 10 of FIG. 1 is identified in Table 1.

Figure 9:
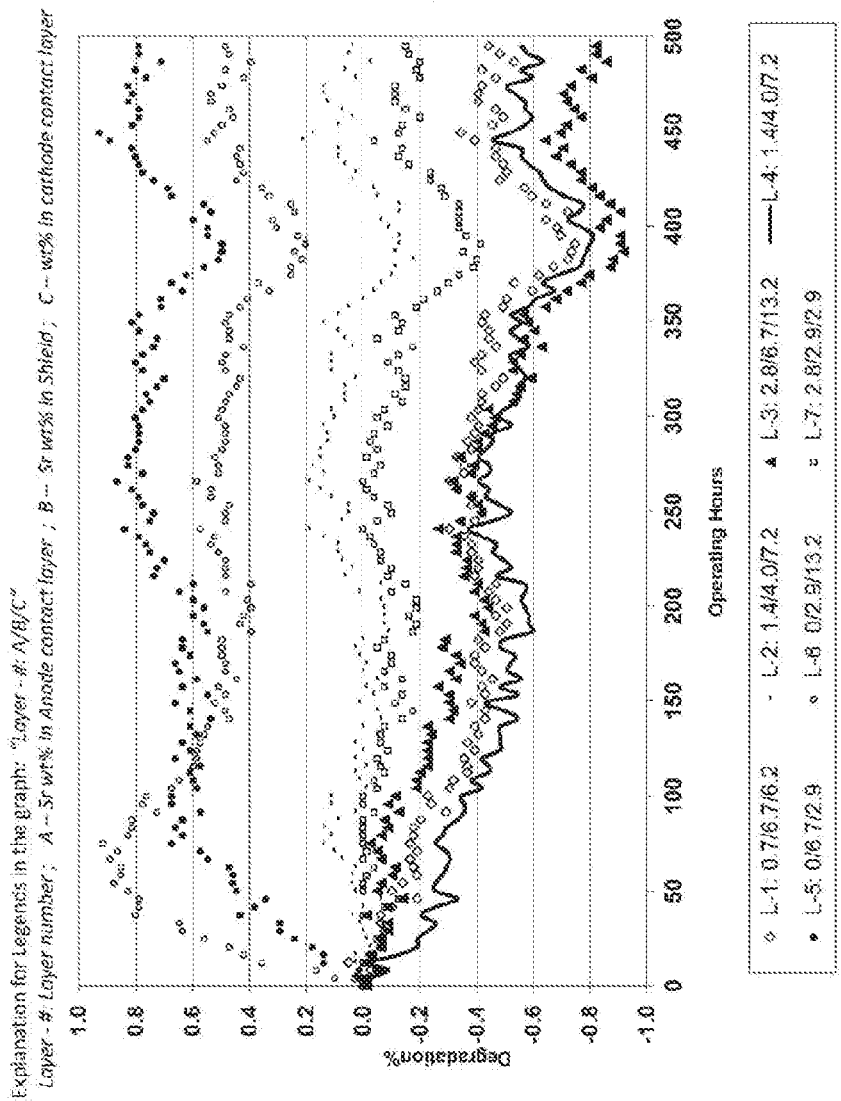
FIG. 9 is a graph showing the effect on degradation of different amounts of strontium oxide in various layers of the cell assembly.
Figure 10:
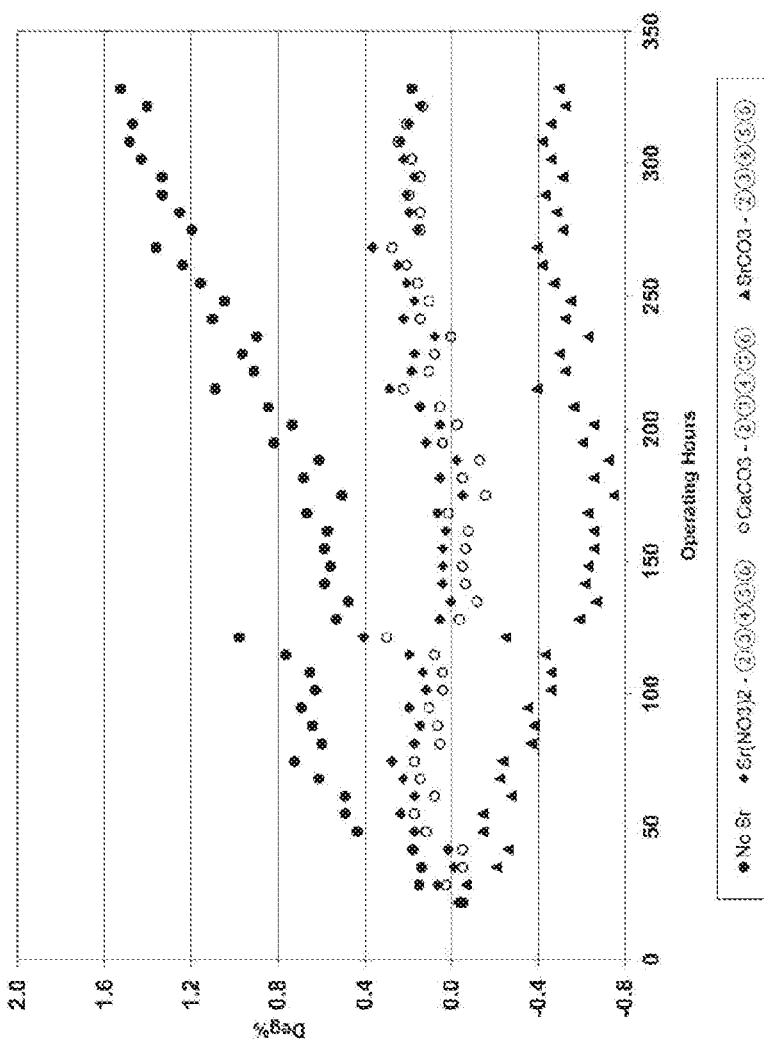
FIG. 10 is a graph contrasting the effect on degradation of the cell assembly of FIG. 1 of introducing free oxide to various locations of the cell in different forms.

FIG. 10 also illustrates the provision of SrO from strontium nitrate precursor at positions 2 to 6 and the description below for this provision in relation to FIGS. 2 to 9 applies to FIG. 10 also. However, FIG. 10 contrasts this provision with providing the free SrO from strontium carbonate and free CaO from calcium carbonate, each at the same locations, positions 2 to 6.

Figure 12:
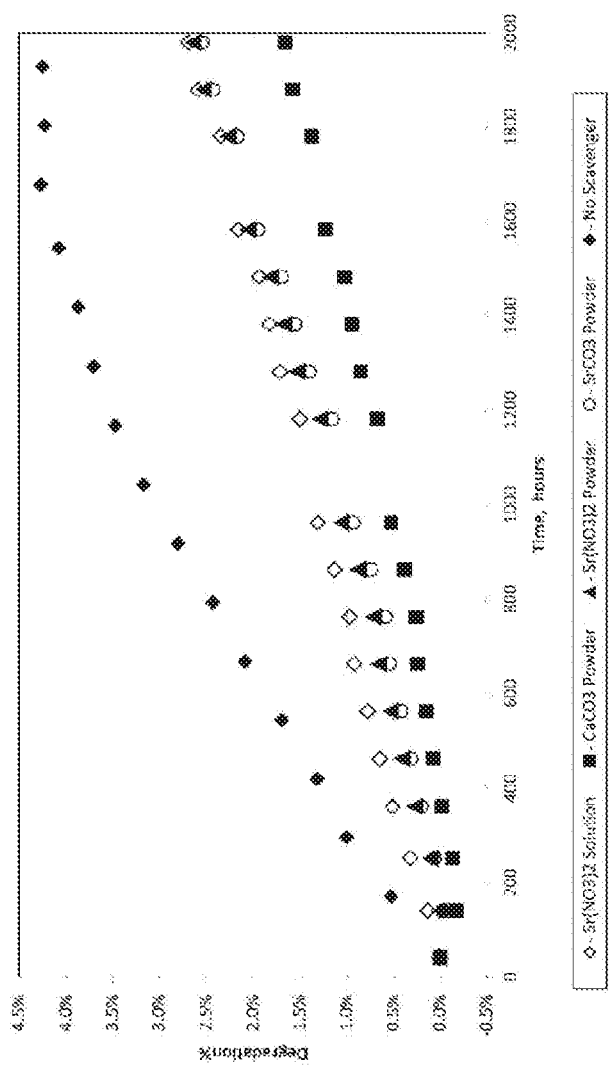
FIG. 12 is a graph contrasting the effect on degradation of different free oxide precursors.

FIG. 12 contrasts the effect on degradation of using different strontium and calcium precursor materials and forms.

TABLE 1

| SrO Position | Description of Location |
|---|---|
| 1 | Free SrO coating on the anode interconnect plate 16 between the dense contact layer 50 and the porous nickel contact layer 48. |
| 2 | Free SrO dispersed in the anode interconnect plate porous contact layer 48. |
| 3 | Free SrO dispersed in the anode cell porous nickel contact layer 42. |
| 4 | Free SrO dispersed in the cathode shield layer 24. |
| 5 | Free SrO dispersed in the cathode cell porous contact layer 26. |
| 6 | Free SrO dispersed in the cathode interconnect contact layer 32. |
| 7 | Free SrO coating on the cathode interconnect plate 14 between the cathode interconnect plate barrier coating 34 and the cathode interconnect plate porous contact layer 32. |

In positions 1 and 7, the free SrO coating or wash coat is applied to the entire extent of the respective dense layer 50 and 34, including in the respective grooves or channels 44 and 28, not just beneath the respective interconnect plate porous contact layer 48 or 32.

The same strontium solution is used for both the coatings at positions 1 and 7 and for dispersing the strontium nitrate precursor in the layers at positions 2 to 6. The Sr(NO$_3$)$_2$ is converted to SrO on heating in air.

The strontium solution is made up of strontium nitrate, water and a dispersant. Initially, strontium nitrate is weighed, followed by the addition of a required amount of water. The strontium nitrate is dissolved in the water by heating the mixture in a water bath in a: temperature range of 40-70° C., while being stirred. A dispersant is added to the solution to prevent the strontium nitrate from recrystallising at temperatures less than 15° C. and to assist dispersing the strontium nitrate in the inks used for incorporating the strontium into the layer materials for positions 2 to 6. The concentration of strontium nitrate solution is slightly lower than the saturation level at normal temperature and pressure, to avoid the recrystallisation problem.

For the porous nickel contact layers 48 and 42 at positions 2 and 3, the strontium is dispersed in the following way. The required quantities of nickel powder, pore former and binder are weighed and mixed in a high shear mixer. Once the mixture is homogenised, the required quantity of the strontium nitrate solution is added and the new mixture is homogenised again in the high shear mixer to produce an ink suitable for screen printing of the layers.

For the porous perovskite contact layers 26 and 32 at positions 5 and 6, the required quantities of lanthanum strontium cobaltite (LSCo) powder and binder are mixed by hand until they are blended together. The blended mixture is then triple roll milled for a number of passes before the pore former and additional binder are added to the triple-rolled mixture and homogenised in a high shear mixer. Once the mixture is homogenised, the required quantity of the strontium nitrate solution is added and homogenised again in the high shear mixer to produce an ink suitable for screen printing of the layers.

The screen printing ink preparation for the perovskite cathode shield layer 24 at position 4 is prepared in exactly the same way as the cathode side porous contact layer inks, except that no pore former is added to the mixture.

For the screen printing inks, the strontium may be added to a level where in the fired product the free strontium oxide and any residual precursor strontium nitrate are present at a total level of from 0.1 to 65 vol % relative to the total solids content of the layer, more preferably from 1 to 25 vol %. While there may be advantages to providing levels of the free strontium material above 25 vol % up to the maximum indicated of 65 vol %, doing so may lead to difficulties in maintaining the stability of the screen printing inks, and it is for this reason that 25 vol % is the preferred maximum. Levels of strontium oxide tested in the cathode side contact layers and shield layer have been from 2.8-13.2 wt %, while the corresponding range for the anode side contact layers is 0.6-13.2 wt %. Free strontium nitrate has also been added to the anode substrate layer 40, at a level of 0.64 wt %.

Table 2 sets out Examples of compositions for the strontium nitrate solution, the cathode side porous contact layer inks, the cathode shield layer ink and the anode side porous contact layer inks. In Table 2, no ranges are given for the amount of LSCo, pore former and nickel as the LSCo/pore former and Ni/pore former ratios were maintained constant.

Some commercial names are referred to in Table 2 (and in Tables 6 to 8), and these are explained in Table 3, along with their source.

The strontium nitrate solution is applied to the cathode and anode interconnect plates 14 and 16 by spraying the solution onto the respective faces 36 and 52, over the respective dense layers 34 and 50, but excluding the areas contacted by the glass seals 58 and 56, respectively. The required weight of strontium nitrate is achieved by controlling the number of spray passes, to provide coating thicknesses in the range 0.01 to 250 µm, preferably 0.01 to 50 µm.

TABLE 2

Sr(NO$_3$)$_2$ Solution

| | | | Range | |
| --- | --- | --- | --- | --- |
| | Material | Current Weight, g | with min. AMP95 | with max. AMP95 |
| Scavenger precursor | Sr(NO$_3$)$_2$ | 36 | 36.0% | 36.0% |
| Medium | Water | 54.8 | 64.0% | 44.0% |
| Dispersant | AMP95 | 9.2 | 0.0% | 20.0% |

| | Material | Current Weight, g | Preferred Range, g | Broadest Range, g |
| --- | --- | --- | --- | --- |
| Positive side Porous Layer ink | | | | |
| Conducting Phase | LSCo | 32.9 | 32.9 | 32.9 |

TABLE 2-continued

| | Sr(NO$_3$)$_2$ Solution | | | |
|---|---|---|---|---|
| Binder 1 | Cerdec 80683 | 18.7 | 10-25 | 1-25 |
| Binder 2 | Cerdec 80858 | 18.7 | 10-25 | 1-25 |
| Pore-former | Graphite | 16.0 | 16.0 | 16.0 |
| Scavenger | Sr(NO$_3$)$_2$ solution | 13.7 | 1.32-42.0 | 0.132-232 |
| | Positive side Shield Layer ink | | | |
| Conducting Phase | LSCo | 48.9 | 48.9 | 48.9 |
| Binder 1 | Cerdec 80683 | 16.3 | 10-25 | 1-25 |
| Binder 2 | Cerdec 80858 | 16.3 | 10-25 | 1-25 |
| Scavenger | Sr(NO$_3$)$_2$ solution | 18.5 | 1.97-62.4 | 0.197-345 |
| | Negative side Porous Layer ink | | | |
| Conducting Phase | Ni | 35.6 | 35.6 | 35.6 |
| Binder 1 | Cerdec 80683 | 18.3 | 10-25 | 1-25 |
| Binder 2 | Cerdec 80858 | 18.3 | 10-25 | 1-25 |
| Binder 3 | PreGel | 5.3 | 5.30 | 5.30 |
| Pore-former | Graphite | 15.3 | 15.3 | 15.3 |
| Scavenger | Sr(NO$_3$)$_2$ solution | 7.2 | 1.43-45.5 | 0.143-251 |

TABLE 3

| Commercial Name | Chemical | wt % | Manufacturer |
|---|---|---|---|
| AMP95 | 2-Amino-2-methyl-1-Propanol<br>Water | 95%<br>5% | Angus Chemical Company, USA |
| Cerdec 80858 | Propanol<br>Hydroxy propyl cellulose ether | ≥60% | Ferro Corporation, USA |
| Cerdec 80683 | Ethanol, &<br>2-(2-ethoxyethoxy)-ethanol<br>Hydroxy propyl cellulose ether | | Ferro Corporation, USA |
| PreGel | Cerdec 80858<br>Cerdec 80683<br>Crayvallac Super | 46%<br>46%<br>8% | Ceramic Fuel Cells Ltd, Australia |
| Crayvallac Super | MicronisedPolyamide wax | | Arkrma, France |
| DGME | Diethylene GlycolMonoethyl ether | | DOW Chemicals, USA |
| LSCo | Lanthanum Strontium Cobalt Oxide | | Fuel Cell Materials, USA |
| Nickel | Ni | | Novamet Specialty Products Corporation, USA |

Figure 2:
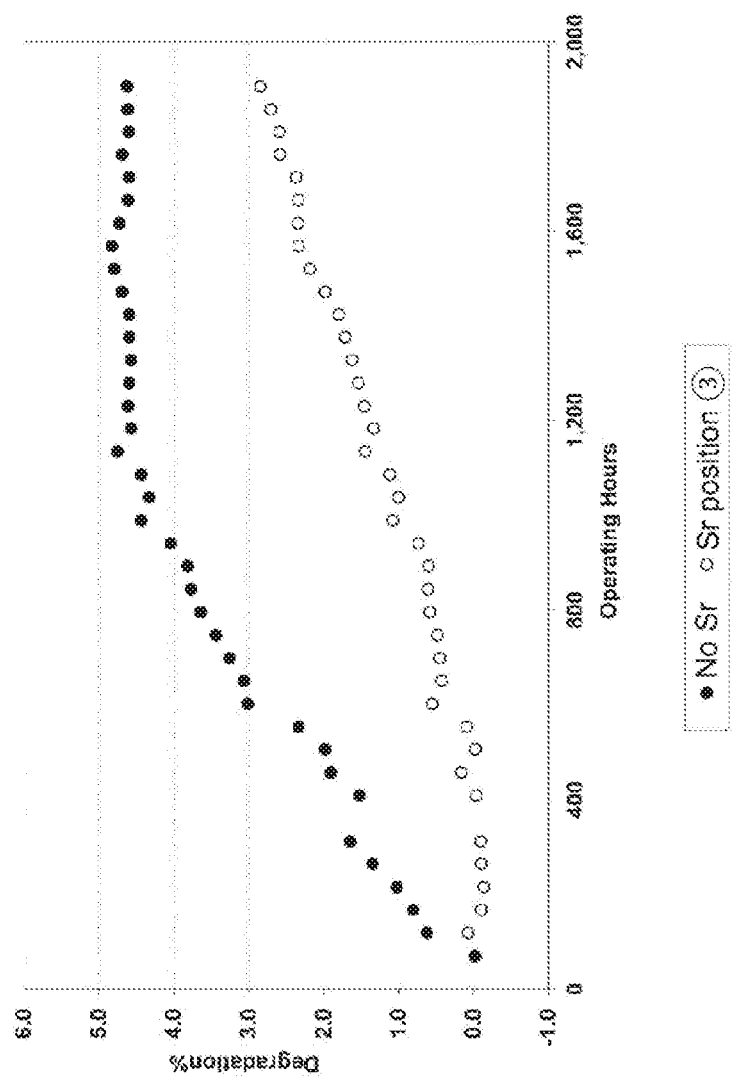
FIG. 2 is a graph of the effect on degradation of the cell assembly of FIG. 1 of introducing free strontium oxide to a negative electrode side cell contact layer.

Referring now to the graphs, in FIG. 2 free strontium oxide is provided only in the anode cell contact layer 42 of the cell assembly 10 and provides a substantial reduction in the degradation in electrical output from the assembly over the First 2000 hours of operation relative to no free SrO.

Figure 3:
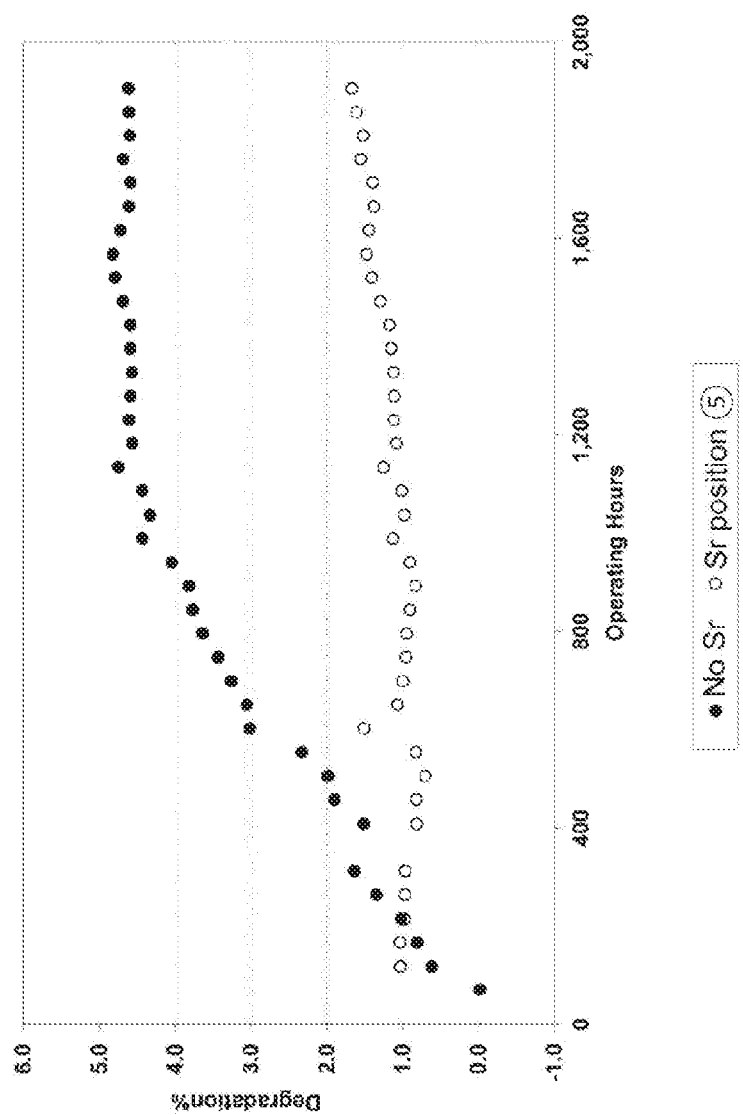
FIG. 3 is a graph of the effect on degradation of the cell assembly of FIG. 1 of introducing free strontium oxide to a positive electrode side cell contact layer.

Referring to FIG. 3, the free strontium oxide is provided in the cell assembly 10 only in the cathode cell contact layer 26, and may be seen to reduce the electrical output degradation from about 5% (when no free SrO is present) at nearly 2000 hours to under 2%.

Figure 4:
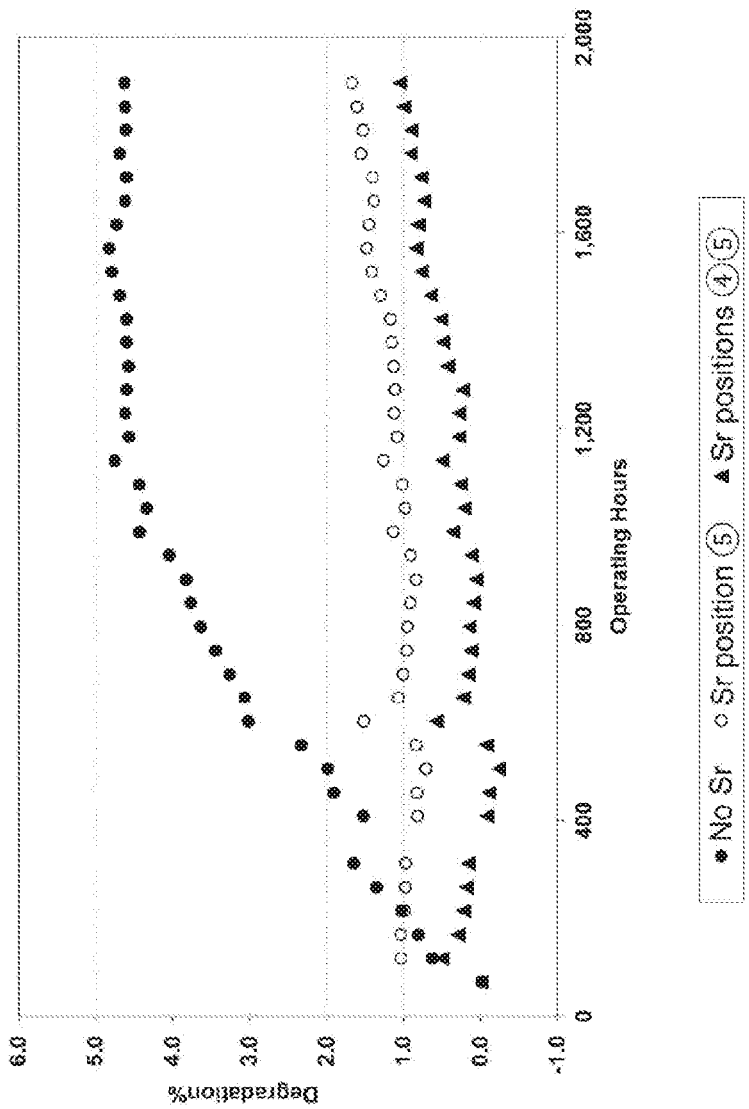
FIG. 4 is a graph of the effect on degradation of the cell assembly of FIG. 1 of introducing free strontium oxide to a positive electrode side cell contact layer as well as in both the contact layer and a shield layer.

FIG. 4 duplicates the results of FIG. 3, but also shows the effect of additionally including free strontium oxide dispersed in the cathode shield layer 24. With the free strontium oxide dispersed in both the cathode cell contact layer 26 and the cathode shield layer 24, the electrical output degradation is limited to no more than 1% over nearly 2000 hours.

Figure 5:
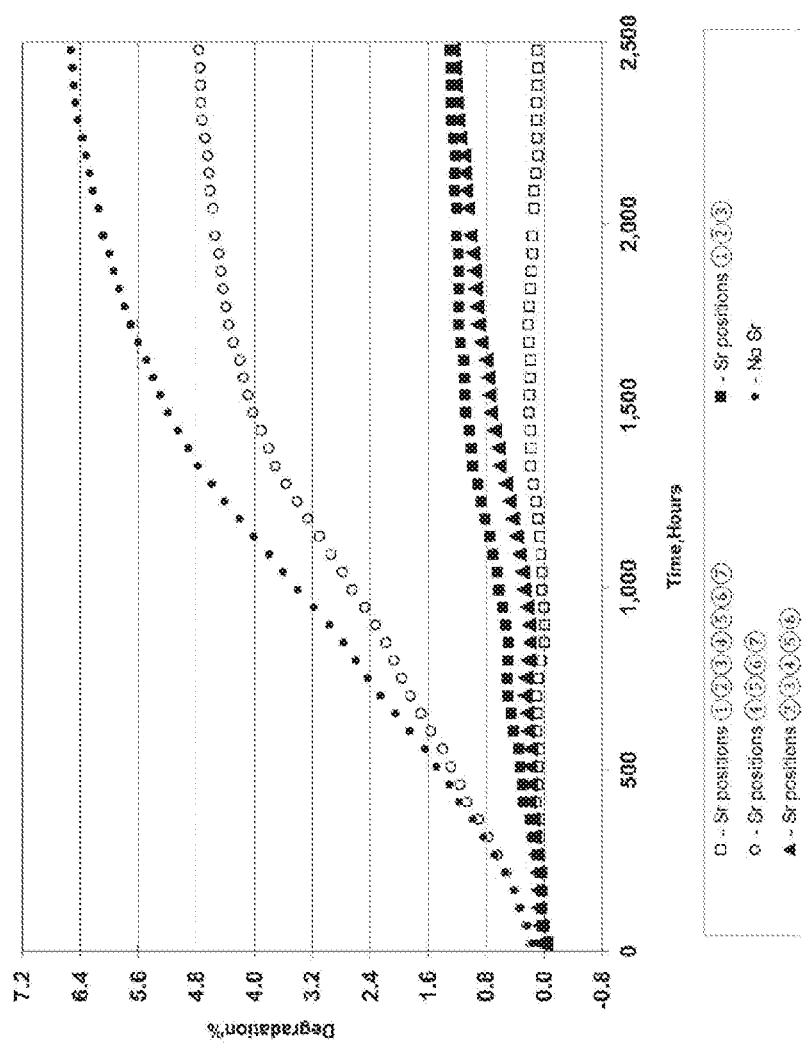
FIG. 5 is a graph similar to FIGS. 2 to 4 but comparing the effect of providing strontium oxide in various locations on the positive electrode side only, on the negative electrode side only, and on both electrode sides.

In FIG. 5, the electrical output degradation of the cell assembly 10 with no free strontium oxide present is contrasted over 2500 hours with providing free strontium oxide at positions 4, 5, 6 and 7 on the cathode side only, at positions 1, 2 and 3 on the anode side only, at positions 2, 3, 4, 5, and 6 (so no free strontium oxide interconnect plate coatings on either side), and at all of positions 1 to 7. It may be seen that over this time frame, the cell electrical output degradation decreases from about 6.5% with no strontium oxide present to about 4.8% with free strontium oxide only present on the cathode side, to about 1.3% for each of the tests in which free strontium oxide is only present on the anode side and is dispersed in all four contact layers and In the shield layer, to about 0.1% when free strontium oxide is present in all 7 positions.

Figure 6:
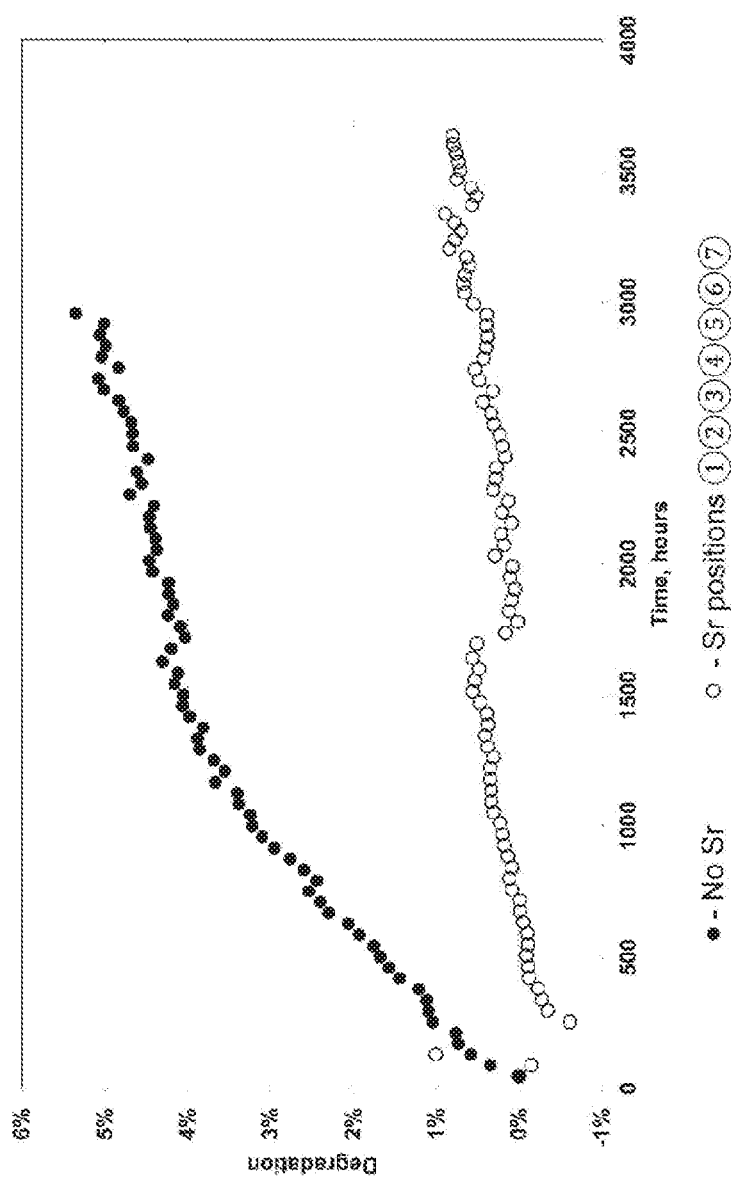
FIG. 6 is a graph similar to FIG. 5, but showing the effect on degradation of providing strontium oxide on both positive and negative electrode sides over a longer period that in FIG. 5.

FIG. 6 illustrates the results of another test of the cell assembly 10 in which free strontium oxide is provided at all 7 positions. Over about 3700 hours, the cell electrical output degradation remained less than 1%. In contrast, at least by 3000 hours the test showed that with no free strontium oxide present the cell electrical output degradation was greater than 5%.

Figure 7:
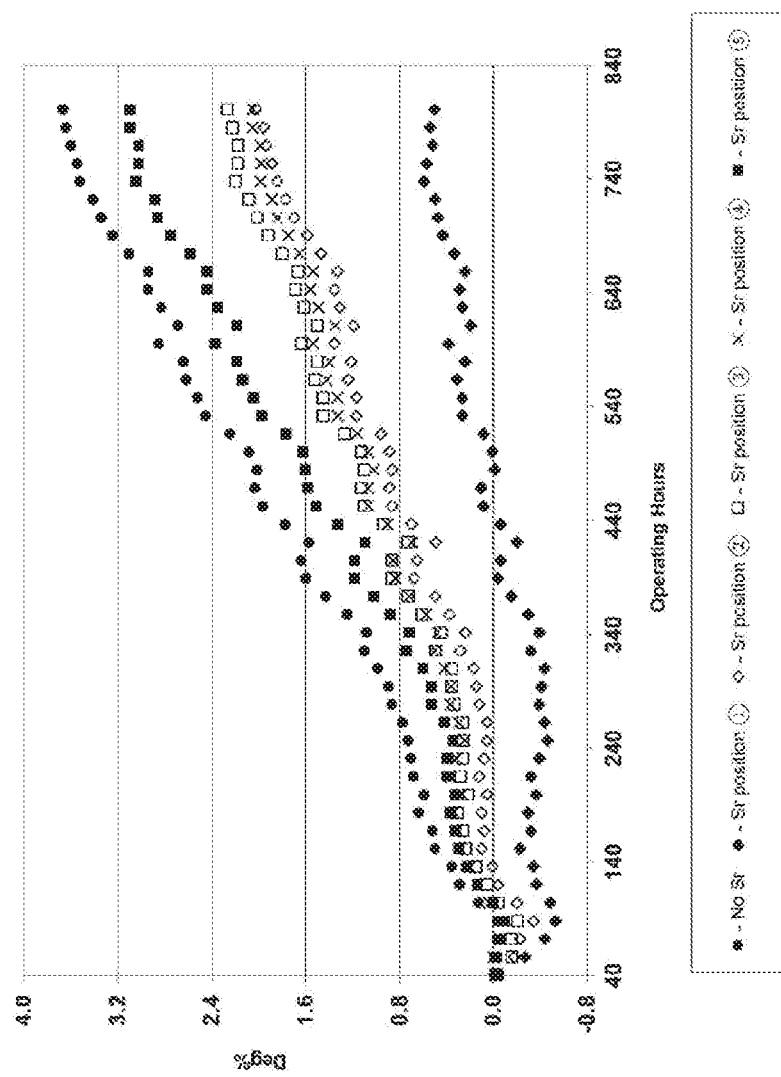
FIG. 7 is a graph of the effect on degradation of the cell assembly of FIG. 1 of introducing free strontium oxide to individual locations of the assembly.

FIG. 7 illustrates another short term test of the cell assembly 10, over about 800 hours, contrasting the provision of no free strontium oxide in the assembly with individual tests where free strontium oxide is provided at positions 1, 2, 3, 4, and 5, respectively. It may be seen that in this test, the provision of free strontium oxide at position 1 only, as a coating on the anode side interconnect plate, improved the electrical output over the initial 450 hours, with negligible degradation in output thereafter.

Figure 8:
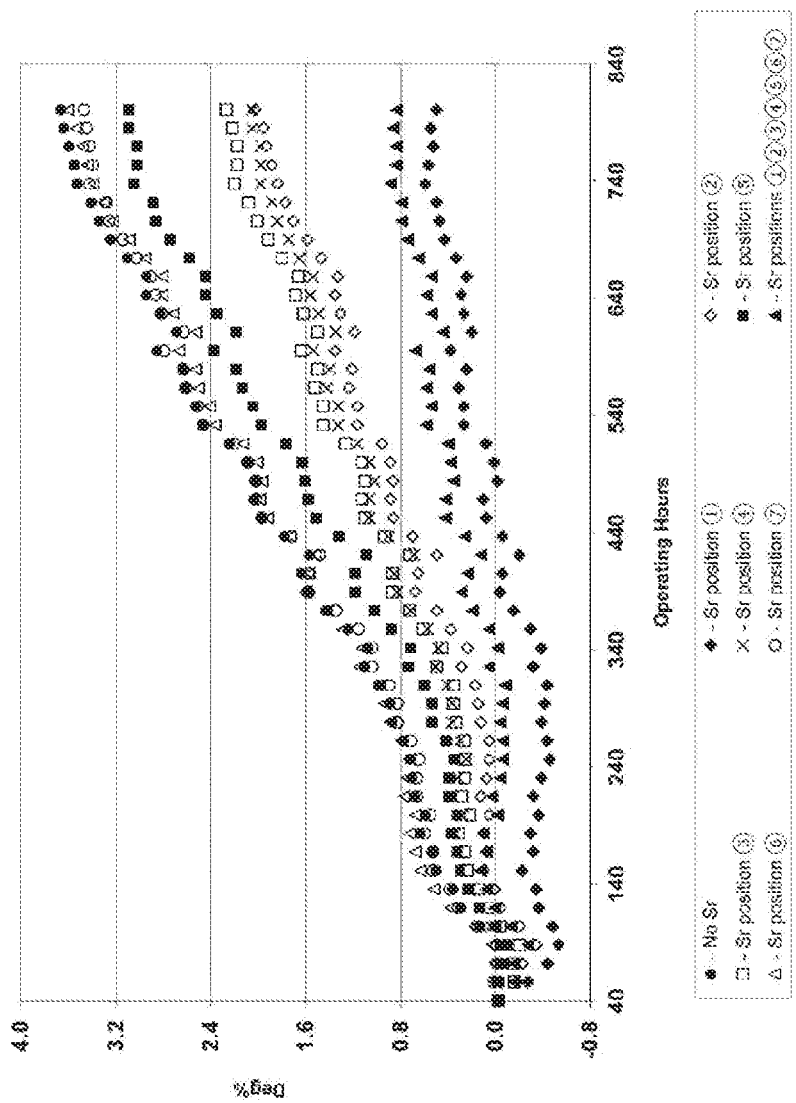
FIG. 8 is a graph similar to FIG. 7, but also showing the overall effect on degradation of providing strontium oxide on numerous locations of the assembly.

FIG. 8 is identical to FIG. 7 except that it also shows the results of a test in which free strontium oxide was provided at all of positions 1 to 7. In this test, the final outcome at about 800 hours for providing the free strontium oxide at all 7 positions was a cell output degradation of about 0.8%, worse than when it was provided only at position 1. The reason for this is not clear to the inventors.

FIG. 9 shows the results of a test of a stack with 7 layers of cell assembly 10 with different proportions of free strontium oxide present in 3 layers of the cell 12, the anode contact layer 42 (position 3), the cathode shield layer 24 (position 4) and the cathode contact layer 26 (position 5). The wt % of free strontium oxide in each layer is identified in the Figure by the formula: Layer-#: A/B/C where layer-#—the layer number; A=the SrOwt % in the anode contact layer; B=the SrOwt % in the cathode shield layer; and C=the SrOwt % in the cathode contact layer.

It may be seen from FIG. 9 that all of the layers showed a cell electrical output degradation of less than 1% over the 500 hours tested, but that layers 1, 3, 4 and 7 all showed an improvement in electrical output. Layer 2 showed overall no change in electrical output after 500 hours, while layers 5 and 6 (with no free strontium oxide in the anode contact layer) showed higher cell output degradations at 500 hours of 0.8% and 0.5 respectively. These may be contrasted with the results in FIGS. 7 and 8, where with no free strontium oxide present at all in the cell assembly the cell output degradation over a similar period was about 2% and over 800 hours approached 4%.

FIG. 10 illustrates another short term test of the cell assembly 10, over about 340 hours, contrasting the provision of no free strontium oxide in the assembly with individual tests where free oxide is provided at positions 2, 3, 4, 5, and 6, respectively. In this test, the free oxide is in three different forms, strontium oxide from strontium nitrate precursor, strontium oxide from strontium carbonate precursor and calcium oxide from calcium carbonate precursor. The strontium nitrate is introduced in the manner described above for positions 2 to 6. The strontium carbonate and calcium carbonate are also added in exactly the same way using the compositions set out in Table 4 and 5, respectively, to achieve the same level of active metal content as in the strontium nitrate.

It may be seen from FIG. 10 that in this test the cell electrical output degraded by about 1.6% over the 340 hours of the test when no free oxide is added, while the output from the cells with strontium oxide from strontium nitrate and calcium oxide from calcium carbonate in positions 2 to 6 degraded by about 0.2% over the same period. On the other hand, the provision of strontium oxide from strontium carbonate at positions 2 to 6 improved the cell output over the same period by about 0.5%.

TABLE 4

FORMULATIONS WITH $SrCO_3$

| Material | Current Weight, g |
|---|---|
| Positive side Porous Layer ink | |
| Conducting Phase  LSCo | 31.6 |
| Binder 1  Cerdec 80683 | 20.2 |
| Binder 2  Cerdec 80858 | 20.2 |
| Solvent  DGME | 9.5 |
| Pore-former  Graphite | 15.2 |
| Scavenger  $SrCO_3$ | 3.3 |
| Positive side Shield Layer ink | |
| Conducting Phase  LSCo | 49.6 |
| Binder 1  Cerdec 80683 | 20.8 |
| Binder 2  Cerdec 80858 | 20.8 |
| Solvent  DGME | 3.6 |
| Scavenger  $SrCO_3$ | 5.1 |
| Negative side Porous Layer ink | |
| Conducting Phase  Ni | 38.9 |
| Binder 1  Cerdec 80683 | 18.2 |
| Binder 2  Cerdec 80858 | 18.2 |
| Solvent  DGME | 6.1 |
| Pore-former  Graphite | 16.6 |
| Scavenger  $SrCO_3$ | 2.0 |

TABLE 5

FORMULATIONS WITH $CaCO_3$

| Material | Current Weight, g |
|---|---|
| Positive side Porous Layer ink | |
| Conducting Phase  LSCo | 26.9 |
| Binder 1  Cerdec 80683 | 29 |
| Binder 2  Cerdec 80858 | 29 |
| Pore-former  Graphite | 12.9 |
| Scavenger  $CaCO_3$ | 2.2 |

TABLE 5-continued

FORMULATIONS WITH $CaCO_3$

| Material | Current Weight, g |
|---|---|
| Positive side Shield Layer ink | |
| Conducting Phase  LSCo | 47.2 |
| Binder 1  Cerdec 80683 | 21.9 |
| Binder 2  Cerdec 80858 | 21.9 |
| Solvent  DGME | 5.0 |
| Scavenger  $CaCO_3$ | 4.0 |
| Negative side Porous Layer ink | |
| Conducting Phase  Ni | 41.9 |
| Binder 1  Cerdec 80683 | 15.5 |
| Binder 2  Cerdec 80858 | 15.5 |
| Solvent  DGME | 6.1 |
| Pore-former  Graphite | 18.0 |
| Scavenger  $CaCO_3$ | 3.0 |

Figure 11:
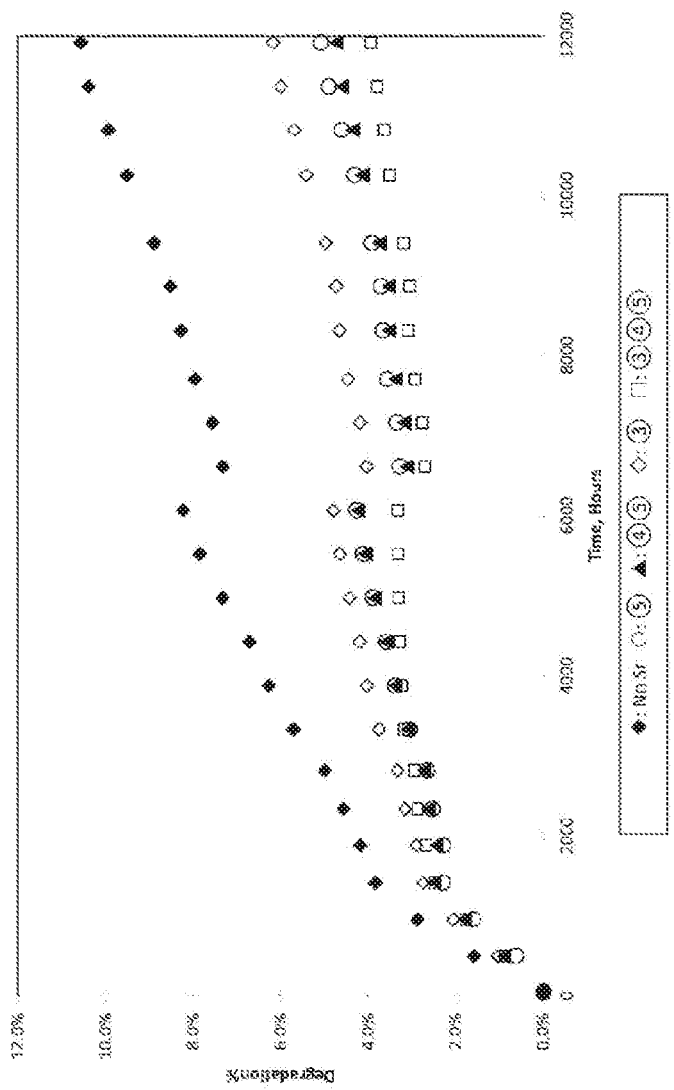
FIG. 11 is a graph showing the long-term effect on degradation of the cell assembly of FIG. 1 of introducing free strontium oxide to individual locations of the assembly.

FIG. 11 contrasts the effect on output degradation over 12,000 hours of the provision of strontium oxide derived from strontium nitrate solution in one or more of positions 3, 4 and 5 in a stack comprising 51 cells similar to that of FIG. 1 with output degradation over the same period when no free oxide scavenger material is provided. This test is effectively an extension of the test described with reference to FIG. 9, with the layer materials for the anode contact layer (position 3), the shield layer (position 4) and the cathode contact layer (position 5) being prepared as described with reference to Table 2.

The test showed that over the 12,000 hours the cell with no free oxide present suffered degradation in electrical output of 10.6%. On the other hand, with free strontium oxide at various of positions 3, 4 and 5 the degradation over the same period was 6.2% at position 3 only, 5.1% at position 5 only, 4.7% at positions 4 and 5, and 3.9% at positions 3, 4 and 5. These degradation rates are the average of several cell layers having the same configuration.

This shows that over the test period of 500 days the provision of free oxide on each of the cathode and anode sides of the cell significantly reduced the degradation in electrical output of the cell—by well over 50% with the free oxide at position 5 only, increasing by about another 4% when the free oxide is both positions 4 and 5 on the cathode side, and by about 45% with the free oxide at position 3 on the anode side only. Furthermore, when the free oxide is provided at all 3 of positions 3, 4 and 5 on the anode and cathode sides the degradation was reduced by almost two thirds over the 500 days.

FIG. 12 contrasts the effect on cell output degradation over 2,000 hours of the provision of free oxide derived from different precursors with output degradation over the same period when no free oxide scavenger material is provided.

Four different precursor materials and forms were tested: $Sr(NO_3)_2$ solution; $CaCO_3$ powder; $Sr(NO_3)_2$ powder; and $SrCO_3$ powder. The precursors were tested in the same positions in respective cells of a stack, namely positions 3, 4 and 5. The layers comprising the $Sr(NO_3)_2$ were prepared as described above with reference to Table 2, while each layer comprising one of the powders was prepared according to Table 6, 7 or 8, respectively.

The test showed that over the 2,000 hours the cell with no oxide present suffered degradation in electrical output of 4.3%. On the other hand, the presence of free oxide derived from the different precursors reduced the degradation to the following levels over the same period: 2.7% for $Sr(NO_3)_2$ solution; 2.6% for $Sr(NO_3)_2$ powder; 2.5% for $SrCO_3$ powder; and 1.7% for $CaCO_3$ powder. Thus, it may be seen that, for example, the provision of free oxide derived from $CaCO_3$ as described reduced the cell output degradation by about 60% or 2.5 times over the test period.

TABLE 6

Formulations with $CaCO_3$ Powder

| | Material | Current Weight, g |
|---|---|---|
| Cathode Contact Layer | | |
| Conducting Phase | LSCo | 32.68 |
| Binder 1 | Cerdec 80683 | 22.87 |
| Binder 2 | Cerdec 80858 | 22.87 |
| Solvent | DGME | 3.4 |
| Pore-former | Graphite | 15.87 |
| Scavenger | $CaCO_3$ | 2.31 |
| Shield Layer | | |
| Conducting Phase | LSCo | 51.96 |
| Binder 1 | Cerdec 80683 | 18.6 |
| Binder 2 | Cerdec 80858 | 18.6 |
| Solvent | DGME | 7.5 |
| Scavenger | $CaCO_3$ | 3.34 |
| Anode Contact Layer | | |
| Conducting Phase | Ni | 35.46 |
| Binder 1 | Cerdec 80683 | 17.41 |
| Binder 2 | Cerdec 80858 | 17.41 |
| Solvent | DGME | 7.68 |
| Binder 3 | PreGel | 5.15 |
| Pore-former | Graphite | 15.23 |
| Scavenger | $CaCO_3$ | 1.65 |

TABLE 7

Formulations with $Sr(NO_3)_2$ Powder

| | Material | Current Weight, g |
|---|---|---|
| Cathode Contact Layer | | |
| Conducting Phase | LSCo | 31.89 |
| Binder 1 | Cerdec 80683 | 22.32 |
| Binder 2 | Cerdec 80858 | 22.32 |
| Solvent | DGME | 3.17 |
| Pore-former | Graphite | 15.51 |
| Scavenger | $Sr(NO_3)_2$ | 4.78 |
| Shield Layer | | |
| Conducting Phase | LSCo | 49.16 |
| Binder 1 | Cerdec 80683 | 17.60 |
| Binder 2 | Cerdec 80858 | 17.60 |
| Solvent | DGME | 9.00 |
| Scavenger | $Sr(NO_3)_2$ | 6.65 |
| Anode Contact Layer | | |
| Conducting Phase | Ni | 35.65 |
| Binder 1 | Cerdec 80683 | 17.50 |
| Binder 2 | Cerdec 80858 | 17.50 |
| Solvent | DGME | 6.44 |
| Binder 3 | PreGel | 5.14 |
| Pore-former | Graphite | 15.34 |
| Scavenger | $Sr(NO_3)_2$ | 2.44 |

TABLE 8

Formulations with $SrCO_3$ Powder

| | Material | Current Weight, g |
|---|---|---|
| Positive side Porous Layer ink | | |
| Conducting Phase | LSCo | 32.13 |
| Binder 1 | Cerdec 80683 | 22.49 |
| Binder 2 | Cerdec 80858 | 22.49 |
| Solvent | DGME | 3.94 |
| Pore-former | Graphite | 15.60 |
| Scavenger | $SrCO_3$ | 3.35 |
| Positive side Shield Layer ink | | |
| Conducting Phase | LSCo | 51.40 |
| Binder 1 | Cerdec 80683 | 18.40 |
| Binder 2 | Cerdec 80858 | 18.40 |
| Solvent | DGME | 6.97 |
| Scavenger | $SrCO_3$ | 4.83 |
| Negative side Porous Layer ink | | |
| Conducting Phase | Ni | 36.04 |
| Binder 1 | Cerdec 80683 | 17.70 |
| Binder 2 | Cerdec 80858 | 17.70 |
| Solvent | DGME | 6.12 |
| Binder 3 | PreGel | 5.24 |
| Pore-former | Graphite | 15.49 |
| Scavenger | $SrCO_3$ | 1.72 |

Further tests were conducted on the cathode side to assess the ability of free oxides derived from different precursors to absorb chromium emissions from a spinel coated interconnect plate prepared as described with reference to FIG. 1. Chromium is a major poison of SOFC cathode materials, and the ability of the free oxide to scavenge such emissions from the interconnect plate or elsewhere rather than them reacting with the cathode material is an important consideration.

In the first test, the abilities of free oxides derived from different carbonate precursors and an LSCF cathode material to absorb the chromium emissions from the spinel coated interconnect plate were investigated at 800° C. over a period of 50 hours. The alkaline earth metal carbonate salts $CaCO_3$, $BaCO_3$ and $SrCO_3$ were each milled to a particle size typically less than 2 μm and were then turned into inks suitable for screen printing use. The ink formulas were similar to the Positive Side Shield Layer Inks described in Tables 4 and 5, with carbonate salts fully replacing LSCo). The LSCF cathode material powder was turned into an ink in a similar manner. All inks were screen printed on to a 3YSZ substrate wafer, forming a coating layer approximately 45 μm thick. The 3YSZ substrate was about 100 μm thick. The LSCF coating was subjected to a firing cycle typical of normal cathode layer fabrication tiring as described herein and all the carbonate coatings were dried at 70° C. only to prepare all the coatings for chromium emission testing.

For the chromium emission test, the 3YSZ wafers with various coating materials were broken into small pieces approximately 10 mm×20 mm in size. These small coupons were placed on top of the spinel coated interconnect plate, with the coating materials facing the plate. The interconnect plate, with coated 3YSZ coupons sitting on top, was fired in atmospheric air and allowed to cool. Once cooled, the coating materials were removed from the 3YSZ substrate by dissolving into an acid solution (usually hydrochloric acid), and analysed for chromium content.

The results are given in Table 9 and show that free oxide derived from each of $CaCO_3$, $BaCO_3$ and $SrCO_3$ has a far greater ability to absorb the chromium emissions than the cathode material and therefore that these free oxide materials in or on various layers of the cathode-side chamber of a device such as is shown in FIG. 1 will be effective in scavenging the chromium emissions before they are able to reach the cathode/electrolyte interface.

TABLE 9

| Material | |Cr| · ppm |
|---|---|
| CaCO$_3$ | 8440 |
| BaCO$_3$ | 6577 |
| SrCO$_3$ | 3140 |
| LSCF | 134 |

In the second test, the abilities of free oxides derived from two other precursor materials, SrC$_2$O$_4$ and NaOH, were tested in comparison with two LSCF cathode materials. One LSCF material was from an earlier purchase batch, applied on a 3YSZ substrate as a coating, designated as LSCF coated 3Y—ZrO$_2$. The other was from a more recent batch, applied on an anode-supported 8YSZ electrolyte substrate (with a spinel barrier layer as described above) as a coating, and designated as LSCF cathode half cell. Both LSCF coatings were applied by screen printing followed by a sinter firing typical for LSCF cathode fabrication. The first precursor material SrC$_2$O$_4$ was provided as an ethanol based SrC$_2$O$_4$ slurry impregnated into the porous LSCF layer of the LSCF cathode half cell, and the second precursor material NaOH was provided as a 0.5M NaOH aqueous solution infiltrated into the porous LSCF layer of the LSCF cathode half cell. Both LSCF coatings, as well as the SrC$_2$O$_4$ slurry impregnated LSCF cathode half cell and the NaOH solution infiltrated LSCF cathode half cell, were tested to absorb chromium emission from the spinel coated interconnect plate at 650° C. over a period of 20 hours. The chromium emission test set-up was similar to that described for the first test.

The test was run twice and the results are given in Table 10. They show that the free oxide derived from each of SrC$_2$O$_4$ and NaOH has a greater ability to absorb the chromium emissions than the cathode material and therefore that these free oxide materials in or on various layers of the cathode-side structure of a fuel cell or electrolyser such as is shown in FIG. 1 will be effective in scavenging the chromium emissions before they are able to reach the cathode/electrolyte interface.

TABLE 10

| Structure | |Cr| · ppm-run 1 | |Cr| · ppm-run 2 |
|---|---|---|
| LSCF coated 3YSZ | 84 | 86 |
| LSCF cathode half cell | 194 | 196 |
| Half cell + SrC$_2$O$_4$ slurry | 584 | 406 |
| Half cell + NaOH solution | 256 | 206 |

The test results for the absorption of chromium species by the half cell with the NaOH solution coating are not substantially better than those for the half cell alone, especially in the second run, but this is as a result of using a weak hydroxide solution. It is believed that using a stronger solution will produce significantly better results.

Those skilled in the art will appreciate that the invention described herein is susceptible to variations and modifications other than those specifically described. It is to be understood that the invention includes all such variations and modifications which fall within its spirit and scope.

Whilst the present invention has been described with reference to specific embodiments and planar fuel cells, it will be appreciated that such embodiments are merely exemplary, and other embodiments other than those described herein will be encompassed by the invention as defined by the appended claims.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. An electrochemical energy conversion device comprising a stack of solid oxide electrochemical cells alternating with gas separators, wherein each electrochemical cell comprises a layer of solid oxide electrolyte, a negative electrode-side structure on one side of the electrolyte layer and comprising one or more porous layers including a functional layer of negative electrode material having an interface with the one side of the electrolyte layer, and a positive electrode-side structure on the opposite side of the electrolyte layer and comprising one or more porous layers including a layer of positive electrode material having an interface with the opposite side of the electrolyte layer, wherein said electrochemical cell and a first of the gas separators on the negative electrode side of the electrochemical cell at least partly form therebetween a negative electrode-side chamber and said electrochemical cell and a second of the gas separators on the positive electrode side of the electrochemical cell at least partly form therebetween a positive electrode-side chamber, and wherein chemically unbound material selected from one or both of free alkali metal oxygen-containing compounds and free alkaline earth metal oxygen-containing compounds is provided in or on one or more of the negative electrode-side structure, the first gas separator and any other structure of the electrochemical energy conversion device forming the negative electrode-side chamber, the chemically unbound material acting to reduce degradation of electrochemical performance on the negative electrode side of the electrochemical energy conversion device during use of the device, and wherein if the chemically unbound material is provided in the functional layer of negative electrode material there is no chemically unbound material present at the interface of that layer with the electrolyte layer.

2. An electrochemical energy conversion device according to claim 1, wherein the chemically unbound material is a scavenger material that is accessible to negative electrode poisons in the atmosphere in the negative electrode-side chamber during use of the device and is more reactive with the poison than is the negative electrode material.

3. An electrochemical energy conversion device according to claim 1, wherein the chemically unbound material is provided in a chemically unbound material coating on one or more of the negative electrode-side structure, the first gas separator and said any other structure forming the negative electrode-side chamber.

4. An electrochemical energy conversion device according to claim 3, wherein said any other structure forming the negative electrode-side chamber comprises one or more of a separate conductor layer and a separate compliant layer between the first gas separator and the negative electrode-side structure.

5. An electrochemical energy conversion device according to claim 3, wherein the chemically unbound material coating is discontinuous.

6. An electrochemical energy conversion device according to claim 3, wherein the chemically unbound material coating has a thickness of about 0.01 to 250 µm.

7. An electrochemical energy conversion device according to claim 1, wherein the chemically unbound material is dispersed in at least one of the one or more porous layers of the negative electrode-side structure.

8. An electrochemical energy conversion device according to claim 7, wherein the one or more porous layers of the negative electrode-side structure comprises, in addition to the functional layer of negative electrode material, a negative electrode-side layer of electrical contact material.

9. An electrochemical energy conversion device according to claim 7, wherein the one or more porous layers of the negative electrode-side structure comprises, in addition to the functional layer of negative electrode material, a negative electrode-side layer of substrate material.

10. An electrochemical energy conversion device according to claim 1, wherein the first gas separator comprises a dense substrate, one or more porous layers on a side of the substrate facing the negative electrode-side chamber and/or a protective coating on a side of the substrate facing the negative electrode-side chamber and in contact with the substrate, and wherein the chemically unbound material is provided in at least one of the one or more porous layers of the first gas separator and/or the protective coating.

11. An electrochemical energy conversion device according to claim 10, wherein the chemically unbound material in any one porous layer or in the protective coating is provided at a level in the range of about 0.1 to 65 vol % of the total solid content of the layer or coating.

12. A electrochemical energy conversion device according to claim 1, wherein the chemically unbound material comprises free oxide selected from one or more of SrO, CaO, BaO, MgO, Na$_2$O and K$_2$O.

13. An electrochemical energy conversion cell comprising a layer of solid oxide electrolyte, a negative electrode-side structure on one side of the electrolyte layer and comprising one or more porous layers including a functional layer of negative electrode material having an interface with the one side of the electrolyte layer, and positive electrode-side structure on the opposite side of the electrolyte layer and comprising one or more porous layers including a layer of positive electrode material having an interface with the opposite side of the electrolyte layer, wherein chemically unbound material selected from one or both of free alkali metal oxygen-containing compounds and free alkaline earth metal oxygen-containing compounds is provided in or on the negative electrode-side structure and acts to reduce degradation of electrochemical performance on the negative electrode-side of the electrochemical energy conversion cell during use of the cell, and wherein if the chemically unbound material is provided in the functional layer of negative electrode material there is no chemically unbound material present at the interface of that layer with the electrolyte layer.

14. An electrochemical energy conversion cell according to claim 13, wherein the chemically unbound material is a scavenger material that is accessible to negative electrode poisons in atmosphere contacting the negative electrode-side structure during use of the cell and is more reactive with the poisons than is the negative electrode material.

15. An electrochemical energy conversion cell according to claim 13, wherein the chemically unbound material is provided in a discontinuous unbound material coating on the negative electrode-side structure.

16. An electrochemical energy conversion cell according to claim 15, wherein the chemically unbound material coating has a thickness of about 0.01 to 250 µm.

17. An electrochemical energy conversion cell according to claim 13, wherein the chemically unbound material is dispersed in at least one of the one or more porous layers of the negative electrode-side structure.

18. An electrochemical energy conversion cell according to claim 17, wherein the one or more porous layers of the negative electrode-side structure comprises, in addition to the functional layer of negative electrode material, a negative electrode-side layer of electrical contact material.

19. An electrochemical energy conversion cell according to claim 17, wherein the one or more porous layers of the negative electrode-side structure comprises, in addition to the functional layer of negative electrode material, a negative electrode-side layer of substrate material.

20. An electrochemical energy conversion cell according to claim 13, wherein the chemically unbound material in any one porous layer is provided at a level in the range of about 0.1 to 65 vol % of the total solid content of the layer.

21. An electrochemical energy conversion cell according to claim 13, wherein the chemically unbound material comprises free oxide selected from one or more of SrO, CaO, BaO, MgO, Na$_2$O and K$_2$O.

* * * * *